(12) United States Patent
Tsuda et al.

(10) Patent No.: US 6,535,232 B1
(45) Date of Patent: Mar. 18, 2003

(54) DEVICE FOR CONTROLLING QUALITY OF REPRODUCTION OF MOTION PICTURE AND METHOD FOR CONTROLLING THE SAME

(75) Inventors: Kenjiro Tsuda, Hirakata (JP); Yoshihisa Nishigori, Ikeda (JP); Satoru Inagaki, Suita (JP); Takayasu Miki, Hirakata (JP); Yoshimasa Sogo, Osaka (JP); Yoshimori Nakase, Kawachinagano (JP); Akira Yoneyama, Higashiosaka (JP); Hironori Nakano, Katano (JP); Tetsuya Imamura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/424,064
(22) PCT Filed: Mar. 18, 1999
(86) PCT No.: PCT/JP99/01348
§ 371 (c)(1), (2), (4) Date: Feb. 14, 2000
(87) PCT Pub. No.: WO99/48050
PCT Pub. Date: Sep. 23, 1999

(30) Foreign Application Priority Data

Mar. 18, 1998 (JP) .......................... 10-068429

(51) Int. Cl.$^7$ .................. G06F 3/00; G06T 15/70; G06T 11/40
(52) U.S. Cl. ............... 345/849; 345/848; 345/638; 345/583; 345/428; 345/427
(58) Field of Search ................. 345/849, 848, 345/764, 757, 850, 839, 756, 638, 634, 629, 582–583, 585–587, 428, 427, 419, 426; 463/32, 33, 31

(56) References Cited

U.S. PATENT DOCUMENTS

| | | | | |
|---|---|---|---|---|
| 4,855,934 A | * | 8/1989 | Robinson | 345/582 |
| 4,974,176 A | * | 11/1990 | Buchner et al. | 345/428 |
| 5,577,960 A | | 11/1996 | Sasaki | 345/428 X |
| 5,651,104 A | * | 7/1997 | Cosman | 345/428 |
| 5,696,892 A | | 12/1997 | Redmann et al. | 345/582 |
| 5,877,771 A | * | 3/1999 | Drebin et al. | 345/586 |
| 5,986,663 A | * | 11/1999 | Wilde | 345/428 |
| 6,191,793 B1 | * | 2/2001 | Piazza et al. | 345/582 |
| 6,229,549 B1 | * | 5/2001 | Smith | 345/419 |

FOREIGN PATENT DOCUMENTS

| | | |
|---|---|---|
| EP | 0 599 579 | 6/1994 |
| JP | 10222692 | 8/1989 |
| JP | 7-287775 | 10/1995 |
| JP | 7-288791 | 10/1995 |

* cited by examiner

Primary Examiner—Raymond J. Bayerl
(74) Attorney, Agent, or Firm—Wenderoth, Lind & Ponack, L.L.P.

(57) ABSTRACT

An apparatus comprises an object generation unit for generating an object based on three-dimensional object data externally input, an object position determination unit that moves the generated object according to a user input, and thereby determines an object position, a view point position determination unit that moves a view point according to the user input and thereby determines a view point position, a distance calculation unit for calculating a distance from the object position and the view point position, a frame rate determination unit for determining a frame rate corresponding to the calculated distance on the basis of a set table or formula, and a frame rate control unit and a moving image generation unit for reproducing the moving image with the frame rate of moving image data externally input reduced.

20 Claims, 9 Drawing Sheets

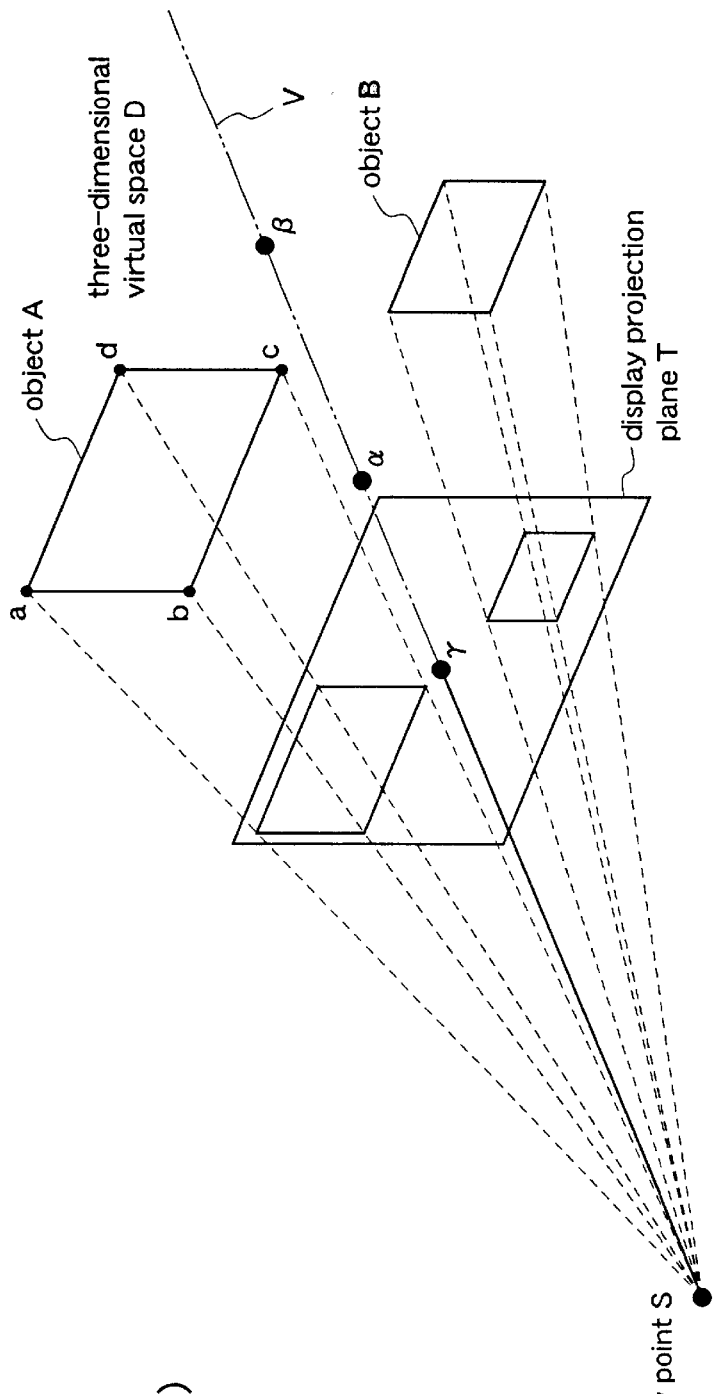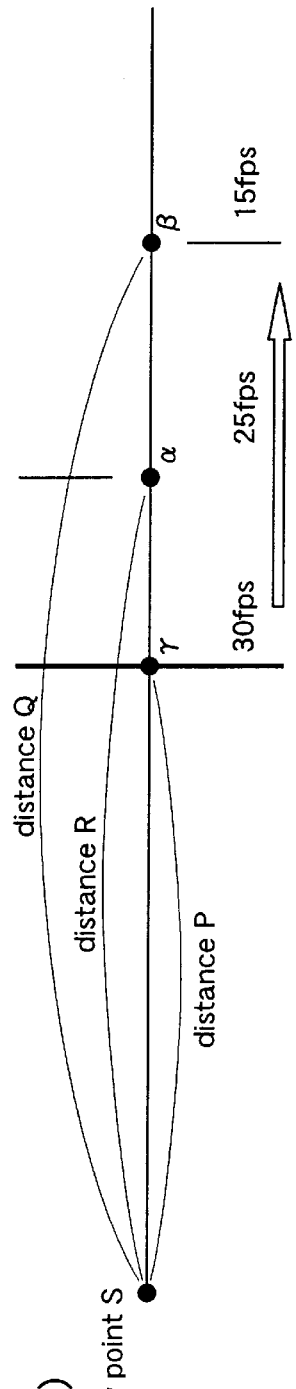
Fig.2 (a)
Fig.2 (b)

DEVICE FOR CONTROLLING QUALITY OF REPRODUCTION OF MOTION PICTURE AND METHOD FOR CONTROLLING THE SAME

TECHNICAL FIELD

The present invention relates to a method and apparatus for controlling quality of moving image reproduction in a three-dimensional virtual space.

BACKGROUND ART

Conventionally, control of reproduction quality such as a frame rate or image quality of a moving image in reproduction of the same, is performed mainly for data on a transmission line, and the moving image transmitted therethrough is the one reproduced according to the frame rate or the image quality set when transmitted.

By the way, in recent years, multimedia data such as the moving image, audio, and three-dimensional computer graphics have been provided through the use of Internet, CD-ROM, DVD, and the like, and contents which comprise the moving image and the three-dimensional computer graphics, fused with each other, and the moving image of which is reproduced in the three-dimensional virtual space, have been created.

When the moving image is reproduced at a spot distant from a view point of a viewer in this three-dimensional virtual space, its display size in a display projection plane is small. In general, when the display size is small, degradation of the moving image reproduction quality is hardly recognized. Hence, when the display size is small, it is not necessary to keep reproduction quality as high as that of the moving image of a large display size. That is, if the frame rate or the image quality is reduced according to the distance from the view point, the viewer can see the image on the display projection plane without any problem.

However, in a conventional moving image reproduction method, since reproduction of the moving image in the three-dimensional virtual space is not taken into account, it is required that the image be reproduced according to the set frame rate or image quality even when the display size is small as described above. The requirement that the same amount of operation be performed regardless of the display size is problematic.

The present invention is directed to solving the above problem, and an object of the present invention is to provide a method and apparatus for controlling reproduction quality of the moving image reproduced in the three-dimensional virtual space according to the distance from the view point.

DISCLOSURE OF THE INVENTION

According to one embodiment of the present invention, there is provided an apparatus for controlling the reproduction quality of a moving image which is reproduced from a fusion of the moving image and three-dimensional computer in a three-dimensional virtual space. In this embodiment, the apparatus comprises: an object veneration means that receives three-dimensional object data relating to an object to which the moving image is to be mapped as an external input, and places the object in the three-dimensional virtual space to generate the object based on the three-dimensional object data; object position determination means that receives data relating to the object placed in the three-dimensional virtual space as an input, moves the object according to an external user input and thereby determines the object position in the three-dimensional virtual space; view point position determination means that receives the determined object position as an input, moves a view point in the three-dimensional virtual space according to an external user input, and thereby determines a view point position according to correlation between the object position and the view point position; distance calculation means that receives the object position and the view point position as inputs and calculates a distance from the view point to the object, frame rate determination means that receives the calculated distance as an input, and determines a frame rate corresponding to the input distance on the basis of a preset table or formula showing a relationship between distances from the view point to the object and frame rates of the moving image to be mapped to the object; frame rate control means that receives the determined frame rate as an input and performs control so that a frame of the moving image to be mapped to the object is reproduced at the determined frame rate; moving image generation means that receives moving image data input externally, and reproduces a necessary frame of the moving image from the moving image data in accordance with the control; and perspective projection display means that receives the object position, the view point position, and the frame of the reproduced moving image as inputs, projects the object on a two-dimensional display projection plane based on the object position and the view point position, maps the frame of the moving image to a projection plane of the object, and displays the resulting image.

According to a second embodiment of the present invention, further to the apparatus for controlling moving image reproduction quality of the first embodiment, the distance calculation means further receives coordinates on the display projection plane in the three-dimensional virtual space as an input, and finds an inclination angle of the object with respect to the display projection plane based on the object position, the view point position, and the coordinates on the display projection plane in the three-dimensional virtual space, and the frame rate determination means updates the frame rate determined according to the distance into a frame rate corresponding to the distance and the inclination angle, on the basis of a preset table or formula showing a relationship between inclination angles and frame rates of the moving image to be mapped to the object.

According to a third embodiment of the present invention, there is provided an apparatus for controlling reproduction quality of a moving image which is reproduced from a fusion of the moving image and three-dimensional computer graphics in a three-dimensional virtual space. The apparatus of this embodiment comprises: object generation means that receives three-dimensional object data relating to an object to which the moving image is to be mapped as an external input, and places the object in the three-dimensional virtual space to generate the object based on the three-dimensional object data; object position determination means that receives data relating to the object placed in the three-dimensional virtual space as an input from the object generation means, moves the object according to an external user input, and thereby determine the object position in the three-dimensional virtual space; view point position determination means that receives the determined object position as an input, moves a view point in the three-dimensional virtual space according to an external user input, and thereby determines a view point position according to correlation between the object position and the view point position; perspective projection means that receives the object position and the view point position as inputs and projects the object on a two-dimensional display projection plane corresponding to the object position and the view point position; area calculation means that receives data relating to a projection plane of the perspectively projected object, and calculates an area of the projection plane; frame rate determination means that receives the calculated area as an input, and determines a frame rate corresponding to the input area with reference to a preset table or formula showing a relationship between areas of the projection plane of the object and frame rates of the moving image to be mapped to the projection plane; frame rate control means that receives the determined frame rate as an input and performs control so that a frame of the moving image to be mapped to the object is reproduced at the determined frame rate; moving image generation means that receives moving image data input externally, and reproduces a necessary frame of the moving image from the moving image data in accordance with the control; and display means that maps the frame of the moving image input from the moving image generation means to the two-dimensional display projection plane on which the object has been perspectively projected as an input from the perspective projection means, and displays the resulting image.

According to a fourth embodiment of the present invention, further to the apparatus for controlling moving image reproduction quality of the first embodiment or the third embodiment, the area calculation means further receives the object position as an input from the perspective projection means, and the frame rate determination means, when three-dimensional object data whose object size has been changed is input externally to the object generation means, further receives the object position as an input from the area calculation means, and recognizes that the object size has been changed, from the object position, and updates the frame rate determined according to the area into a frame rate corresponding to the changed object size, on the basis of a preset table or formula showing a relationship between object sizes and frame rates of the moving image to be mapped to the object.

According to a fifth embodiment of the present invention, there is provided an apparatus for controlling the reproduction quality of a moving image which is reproduced from a fusion of the moving image and three-dimensional computer graphics in a three-dimensional virtual space. The apparatus of this embodiment comprises: object generation means that receives three-dimensional object data relating to an object to which the moving image is to be mapped as an external input, and places the object in the three-dimensional virtual space to generate the object based on the three-dimensional object data; object position determination means that receives data relating to the object placed in the three-dimensional virtual space as an input from the object generation means, moves the object according to an external user input, and thereby determines the object position in the three-dimensional virtual space; view point position determination means that receives the determined object position as an input, moves a view point in the three-dimensional virtual space according to an external user input, and thereby determines a view point position according to correlation between the object position and the view point position; distance calculation means that receives the object position and the view point position as inputs and calculates a distance from the view point to the object; filter selecting means that receives the calculated distance as an input and selects a filter corresponding to the input distance on the basis of a preset table or formula showing a relationship between distances from the view point to the object and filters used for enlarging or reducing the moving image to be mapped to the object; filter control means that receives information about the filter selected by the filter selecting means as an input and performs control so that a frame of the moving image to be mapped to the object is enlarged or reduced by using the selected filter; moving image generation means that receives moving image data input externally and reproduces the frame of the moving image from the moving image data, filtering means that receives the frame of the moving image as an input from the moving image generation means and filters the frame in accordance with the control executed by the filter control means; and perspective projection display means that receives the object position, the view point position, and the filtered frame of the moving image as inputs, projects the object on a two-dimensional display projection plane corresponding to the object position and the view point position, maps the frame of the moving image to a projection plane of the object, and displays the resulting image.

According to a sixth embodiment of the present invention, further to the apparatus for controlling moving image reproduction quality of the fifth embodiment, the distance calculation means further receives coordinates on the display projection plane in the three-dimensional virtual space as an input, and finds an inclination angle of the object with respect to the display projection plane based on the object position, the view point position, and the coordinates on the display projection plane in the three-dimensional virtual space, and the filter selecting means updates the filter selected according to the distance into a filter corresponding to the distance and the inclination angle, on the basis of a preset table or formula showing a relationship between inclination angles and filters used for enlarging or reducing the moving image to be mapped to the object.

According to a seventh embodiment of the present invention, there is provided an apparatus for controlling the reproduction quality of a moving image which is reproduced from a fusion of the moving image and three-dimensional computer graphics in a three-dimensional virtual space. The apparatus of this embodiment comprises: object generation means that receives three-dimensional object data relating to an object to which the moving image is to be mapped as an external input, and places the object in the three-dimensional virtual space to generate the object based on the three-dimensional object data; object position determination means that receives data relating to the object placed in the three-dimensional virtual space as an input from the object generation means, moves the object according to an external user input, and thereby determines the object position in the three-dimensional virtual space; view point position determination means that receives the determined object position as an input, moves a view point in the three-dimensional virtual space according to an external user input, and thereby determines a view point position according to correlation between the object position and the view point position; perspective projection means that receives the object position and the view point position as inputs and projects the object on a two-dimensional display projection plane based on the object position and the view point position; area calculation means that receives data relating to a projection plane of the perspectively projected object, and calculates an area of the projection plane; filter selecting means that receives the calculated area as an input and selects a filter corresponding to the input area on the basis of a preset table or formula showing a relationship between areas of the projection plane of the object and filters used for enlarging or reducing the moving image to be mapped to the projection plane; filter control means that receives information about the selected filter and performs control so that a frame of the moving image to be mapped to the object is enlarged or reduced by using the selected filter; moving image generation means that receives moving image data input externally, and reproduces the frame of the moving image from the moving image data, filtering means that receives the frame of the moving image as an input from the moving image generation means and filters the frame in accordance with the control executed by the filter control means, and display means that maps the frame of the moving image input from the moving image generation means to the two-dimensional display projection plane on which the object has been perspectively projected as an input from the perspective projection means, and displays the resulting image.

According to an eighth embodiment of the present invention, further to the apparatus for controlling moving image reproduction quality of the fifth embodiment or the seventh embodiment, the area calculation means further receives the object position as an input from the perspective projection means, and the filter selecting means, when three-dimensional object data whose object size has been changed is input externally to the object generation means, further receives the object position as an input from the area calculation means, recognizes that the object size has been changed, from the object position, and updates the filter selected according to the area into a filter corresponding to the changed object size, on the basis of a preset table or formula showing a relationship between object sizes and filters used for enlarging or reducing the moving image to be mapped to the object.

According to a ninth embodiment of the present invention, there is provided a method for controlling the reproduction quality of a moving image which is reproduced from a fusion of the moving image and three-dimensional computer graphics in a three-dimensional virtual space. The method of this embodiment comprises: an object generation step that receives three-dimensional object data relating to an object to which the moving image is to be mapped as an external input, and places the object in the three-dimensional virtual space to generate the object based on the three-dimensional object data; an object position determination step that receives data relating to the object placed in the three-dimensional virtual space as an input, moves the object according to an external user input, and thereby determines the object position in the three-dimensional virtual space; a view point position determination step that receives the determined object position as an input, moves a view point in the three-dimensional virtual space according to an external user input, and thereby determines a view point position according to correlation between the object position and the view point position; a distance calculation step that receives the object position and the view point position as inputs and calculates a distance from the view point to the object; a frame rate determination step that receives the calculated distance as an input, and determines a frame rate corresponding to the input distance on the basis of to a preset table or formula showing a relationship between distances from the view point to the object and frame rates of the moving image to be mapped to the object; a frame rate control step that receives the determined frame rate as an input and performs control so that a frame of the moving image to be mapped to the object is reproduced at the determined frame rate; a moving image generation step that receives moving image data input externally, and reproduces a necessary frame of the moving image from the moving image data in accordance with the control; and a perspective projection display step that receives the object position, the view point position, and the reproduced frame of the moving image as inputs, projects the object on a two-dimensional display projection plane based on the object position and the view point position, maps the frame of the moving image to a projection display of the object, and displays the resulting image.

According to a tenth embodiment of the present invention, further to the method for controlling moving image reproduction quality of the ninth embodiment, the distance calculation step further receives coordinates on the display projection plane in the three-dimensional virtual space as an input, and finds an inclination angle of the object with respect to the display projection plane based on the object position, the view point position, and the coordinates on the display projection plane in the three-dimensional virtual space, and the frame rate determination step updates the frame rate determined according to the distance into a frame rate corresponding to the distance and the inclination angle, on the basis of a preset table or formula showing a relationship between inclination angles and frame rates of the moving image to be mapped to the object.

According to an eleventh embodiment of the present invention, there is provided a method for controlling the reproduction quality of a moving image which is reproduced from a fusion of the moving image and three-dimensional computer graphics in a three-dimensional virtual space. The method of this embodiment comprises: an object generation step that receives three-dimensional object data relating to an object to which the moving image is to be mapped as an external input, and places the object in the three-dimensional virtual space to generate the object based on the three-dimensional object data; an object position determination step that receives data relating to the object placed in the three-dimensional virtual space as an input from the object generation step, moves the object according to an external user input and thereby determines the object position in the three-dimensional virtual space; a view point position determination step that receives the determined object position as an input, moves a view point in the three-dimensional virtual space according to an external user input, and thereby determines a view point position according to correlation between the object position and the view point position; a perspective projection step that receives the object position and the view point position as inputs and projects the object on a two-dimensional display projection plane based on the object position and the view point position; an area calculation step that receives data relating to a projection plane of the perspectively projected object and calculates an area of the projection plane; a frame rate determination step that receives the calculated area as an input, and determines a frame rate corresponding to the input area on the basis of a preset table or formula showing a relationship between areas of the projection plane of the object and frame rates of the moving image to be mapped to the projection plane; a frame rate control step that receives the determined frame rate as an input and performs control so that a frame of the moving image to be mapped to the object is reproduced at the determined frame rate; a moving image generation step that receives moving image data input externally, and reproduces a necessary frame of the moving image from the moving image data in accordance with the control; and a display step that maps the frame of the moving image as an input from the moving image generation step to the two-dimensional display projection plane on which the object has been perspectively projected as an input from the perspective projection step, and displays the resulting image.

According to a twelfth embodiment of the present invention, further to the method for controlling moving image reproduction quality of the ninth embodiment or the eleventh embodiment, the area calculation step further receives the object position as an input from the perspective projection step, and the frame rate determination step, when three-dimensional object data whose object size has been changed is given to the object generation step as an external input, further receives the object position as an input from the area calculation step, recognizes that the object size has been changed, from the object position, and updates the frame rate determined according to the area into a frame rate corresponding to the changed object size, on the basis of a preset table or formula showing a relationship between object sizes and frame rates of the moving image to be mapped to the object.

According to a thirteenth embodiment of the present invention, there is provided a method for controlling the reproduction quality of a moving image which is reproduced from a fusion of the moving image and three-dimensional computer graphics in a three-dimensional virtual space. The method of this embodiment comprises: an object generation step that receives three-dimensional object data relating to an object to which the moving image is to be mapped as an external input, and places the object in the three-dimensional virtual space to generate the object based on the three-dimensional object data; an object position determination step that receives data relating to the object placed in the three-dimensional virtual space as an input from the object generation step, moves the object according to an external user, and thereby determines the object position in the three-dimensional virtual space; a view point position determination step that receives the determined object position as an input, moves a view point in the three-dimensional virtual space according to an external user input, and thereby determines a view point position according to correlation between the object position and the view point position; a distance calculation step that receives the object position and the view point position as inputs and calculates a distance from the view point to the object; a filter selecting step that receives the calculated distance as an input and selects a filter corresponding to the input distance on the basis of a preset table or formula showing a relationship between distances from the view point to the object and filters used for enlarging or reducing the moving image to be mapped to the object; a filter control step that receives information about the filter selected in the filter selecting step as an input and performs control so that a frame of the moving image to be mapped to the object is enlarged or reduced by using the selected filter; a moving image generation step that receives moving image data input externally and reproduces the frame of the moving image from the moving image data; a filtering step that receives the frame of the moving image as an input from the moving image generation step and filters the frame in accordance with the control executed in the filter control step; and a perspective projection display step that receives the object position, the view point position, and the filtered frame of the moving image as inputs, projects the object on a two-dimensional display projection plane based on the object position and the view point position, maps the frame of the moving image to a projection plane of the object, and displays the resulting image.

According to a fourteenth embodiment of the present invention, further to the method for controlling moving image reproduction quality of the thirteenth embodiment, the distance calculation step further receives coordinates on the display projection plane in the three-dimensional virtual space as an input, and finds an inclination angle of the object with respect to the display projection plane based on the object position, the view point position, and the coordinates on the display projection plane in the three-dimensional virtual space, and the filter selecting step updates the filter selected according to the distance into a filter corresponding to the distance and the inclination angle, on the basis of a preset table or formula showing a relationship between inclination angles and filters used for enlarging or reducing the moving image to be mapped to the object.

According to a fifteenth embodiment of the present invention, there is provided a method for controlling the reproduction quality of a moving image which is reproduced from a fusion of the moving image and three-dimensional computer graphics in a three-dimensional virtual space. The method of this embodiment comprises: an object generation step that receives three-dimensional object data relating to an object to which the moving image is to be mapped as an external input, and places the object in the three-dimensional virtual space to generate the object based on the three-dimensional object data; an object position determination step that receives data relating to the object placed in the three-dimensional virtual space as an input from the object generation step, moves the object according to an external user input, and thereby determines the object position in the three-dimensional virtual space; a view point position determination step that receives the determined object position as an input, moves a view point in the three-dimensional virtual space according to an external user input, and thereby determines a view point position according to correlation between the object position and the view point position; a perspective projection step that receives the object position and the view point position as inputs and projects the object on a two-dimensional display projection plane based on the object position and the view point position; an area calculation step that receives data relating to a projection plane of the perspectively projected object, and calculates an area of the projection plane; a filter selecting step that receives the calculated area as an input, and selects a filter corresponding to the input area on the basis of a preset table or formula showing a relationship between areas of the projection plane of the object and filters used for enlarging or reducing the moving image to be mapped to the projection plane; a filter control step that receives information about the selected filter and performs control so that a frame of the moving image to be mapped to the object is enlarged or reduced by using the selected filter; a moving image generation step that receives moving image data input externally, and reproduces the frame of the moving image from the moving image data; a filtering step that receives the frame of the moving image as an input from the moving image generation step and filters the frame in accordance with the control executed in the filter control step; and a display step that maps the frame of the moving image as an input from the moving image generation step to the two-dimensional display projection plane on which the object has been perspectively projected as an input from the perspective projection step, and displays the resulting image.

According to a sixteenth embodiment of the present invention, further to the method for controlling moving image reproduction quality of the thirteenth embodiment or the fifteenth embodiment, the area calculation step further receives the object position as an input from the perspective projection step, and the filter selecting step, when three-dimensional object data whose object size has been changed is given to the object generation step as an external input, further receives the object position as an input from the area calculation step, recognizes that the object size has been changed, from the object position, and updates the filter selected according to the area into a filter corresponding to the changed object size, on the basis of a preset table or formula showing a relationship between object sizes and filters used for enlarging or reducing the moving image to be mapped to the object.

As should be the forgoing, according to the first and ninth embodiments of the present invention, the object position and the view point position in the three-dimensional virtual space are obtained to calculate the distance from the view point position to the object, the frame rate of the moving image to be mapped to the object is determined according to the distance and on the basis of the preset table or formula, and the frame of the moving image with the frame rate reduced is generated from the moving image data externally input according to the determined frame rate and mapped to the object. Therefore, when a display portion of the object on the display projection plane is smaller, the frame rate of the moving image of the object is reduced. Thereby, without making the user feel degradation of quality of the reproduced moving image on the display screen, the amount of operation in decoding for generating the moving image or texture mapping can be reduced.

According to the second and tenth embodiments of the present invention, when the inclination angle of the object with respect to the display projection plane is changed, it is decided that the inclination has been changed, from the object position, the view point position, and the three-dimensional coordinates on the display projection plane, and the frame rate is determined according to the changed inclination and on the basis of the preset table or formula showing the relationship between the inclinations and the frame rates. Since the display portion on the display projection plane becomes smaller with an increase in the inclination angle of the object with respect to the display projection plane, the frame rate of the moving image of the object is adjusted by reducing it. Thereby, without making the user feel degradation of quality of the reproduced moving image on the display screen, the amount of operation in decoding for generating the moving image or texture mapping can be reduced.

According to the third and eleventh embodiments of the present invention, the area of the object on the display projection plane is calculated based on the two-dimensional image data obtained by performing perspective transformation of the object according to the object position and the view point position in the three-dimensional virtual space, and the frame rate of the moving image to be mapped to the object is determined according to the area and on the basis of the preset table or formula, and the frame of the moving image with the frame rate reduced is generated from the moving image data externally input according to the determined frame rate and mapped to the object. Therefore, when the display portion of the object on the display projection plane is smaller, the frame rate of the moving image of the object is reduced. Thereby, without making the user feel degradation of quality of the reproduced moving image on the display screen, the amount of operation in decoding for generating the moving image or texture mapping can be reduced.

According to the fourth and twelfth embodiments of the present invention, when the size of the object in the three-dimensional virtual space is changed, it is decided that the size of the object has been changed, from the object position (three-dimensional coordinates of the object), and the frame rate is determined on the basis of the table or formula reselected based on the size from the preset tables or formulas. Therefore, according to change of the size of the object in the three-dimensional virtual space, the frame rate of the moving image of the object is adjusted. Thereby, without making the user feel degradation of quality of the reproduced moving image on the display screen, the amount of operation in decoding for generating the moving image or texture mapping can be reduced.

According to the fifth and thirteenth embodiments of the present invention, the object position and the view point position in the three-dimensional virtual space are obtained to calculate the distance from the view point position to the object, the filter used for filtering that enlarges or reduces the moving image to be mapped to the object is selected according to the distance and on the basis of the preset table or formula, and the frame of the moving image generated from the moving image data externally input is processed by using the selected filter and mapped to the object. Therefore, when the display portion of the object on the display projection plane is smaller, the image quality of the moving image of the object is reduced. Thereby, without making the user feel degradation of quality of the reproduced moving image on the display screen, the amount of calculations required for filtering that enlarges or reduces the moving image can be reduced.

According to the sixth and fourteenth embodiments of the present invention, when the inclination of the object with respect to the display projection plane is changed, it is decided that the inclination has been changed, from the two-dimensional coordinates of the object on the display projection plane, and the filter according to the changed inclination is selected on the basis of the table showing the correspondence between inclinations and filters to-be-selected. Therefore, by controlling the filtering for enlarging or reducing the moving image of the object, the amount of calculations required for filtering that enlarges or reduces the moving image can be reduced, without making the user feel degradation of quality of the reproduced moving image on the display screen.

According to the seventh and fifteenth embodiments of the present invention, the object position and the view point position in the three-dimensional virtual space are obtained, the area of the object on the display projection plane is calculated based on the two-dimensional image data obtained by performing perspective transformation of the object, the filter used for filtering that enlarges or reduces the moving image to be mapped to the object is selected according to the area and on the basis of the preset table or formula, and the frame of the moving image generated from the moving image data externally input is processed by using the selected filter and mapped to the object. Therefore, when the display portion of the object on the display projection plane is smaller, the image quality of the moving image of the object is reduced. Thereby, without making the user feel degradation of quality of the reproduced moving image on the display screen, the amount of calculations required for filtering that enlarges or reduces the moving image can be reduced.

According to the eighth and sixteenth embodiments of the present invention, when the size of the object in the three-dimensional virtual space is changed, it is decided that the size has been changed, from the object position (three-dimensional coordinates), and the filter according to the changed size is selected on the basis of the table showing the correspondence between object sizes and filters to-be-selected. Therefore, by controlling the filtering for enlarging or reducing the moving image of the object according to change of the size of the object in the three-dimensional virtual space, the amount of calculations required for filtering that enlarges or reduces the moving image can be reduced, without making the user feel degradation of quality of the reproduced moving image on the display screen.

BRIEF DESCRIPTION OF THE DRAWINGS

FIGS. 2(a) and 2(b) are diagrams showing the relationship between positions of objects in the three-dimensional virtual space and frame rates at which moving images are reproduced, which are used in FIG. 1.

BEST MODE FOR CARRYING OUT THE INVENTION

Now, preferred embodiments of the present invention will be described in detail with reference to the accompanying drawings.

Embodiment 1

Figure 1:
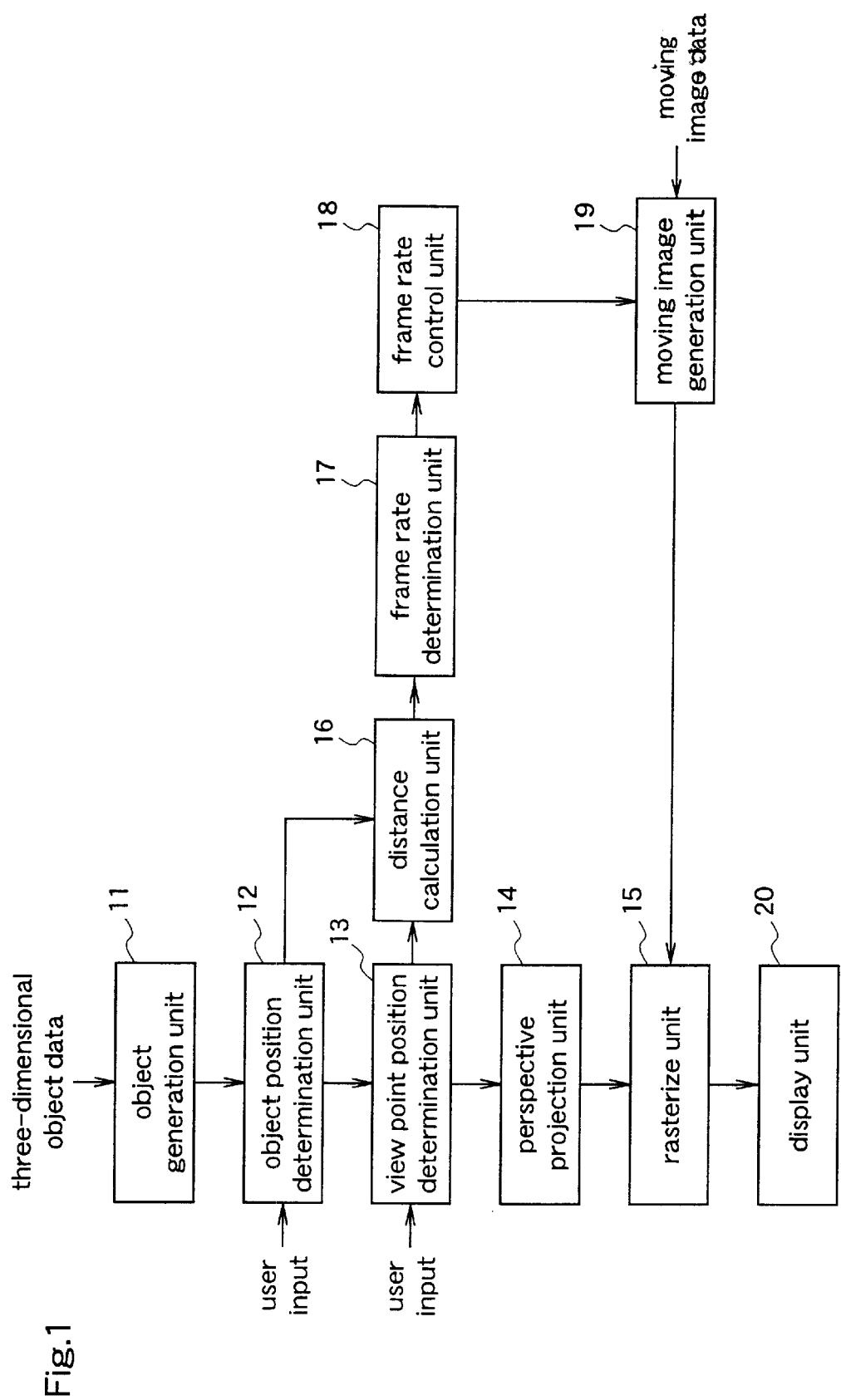
FIG. 1 is a block diagram showing an apparatus for controlling moving image reproduction quality according to a first embodiment of the present invention.

FIG. 1 is a block diagram showing an apparatus for controlling moving image reproduction quality according to a first embodiment of the present invention.

In the figure, reference numeral 11 denotes an object generation unit for generating an object used for mapping a moving image to a three-dimensional virtual space. In general, the object is a plate or a plane of a cube. Three-dimensional coordinates of the object are determined, and thereby an initial value indicating an initial shape and position of the object is determined to generate the object. Reference numeral 12 denotes an object position determination unit that receives the initial value of the object generated and determined by the object generation unit 11 and determines three-dimensional coordinates of the object obtained by changing the initial value according to an external user input. Reference numeral 13 denotes a view point position determination unit for determining a view point position changed according to an external user input with the object position determined by the object position determination unit 12 fixed. The view point position is also represented by three-dimensional coordinates, and an initial value of the view point position is also determined when the initial value of the object is determined by the object generation unit 11. Reference numeral 14 denotes a perspective projection unit for performing perspective transformation of the object according to the three-dimensional coordinates determined by the object position determination unit 12 and the view point position determined by the view point position determination unit 13, to project it on the display projection plane as a two-dimensional image. Reference numeral 15 denotes a rasterize unit for transforming the two-dimensional image which has been perspectively projected by the perspective projection unit 14 into a corresponding image composed of pixel patterns and performing texture mapping for mapping a moving image output from a moving image generation unit to a portion on which the object is projected. Reference numeral 16 denotes a distance calculation unit for calculating a distance from the view point position to the object based on the three-dimensional coordinates of the object determined by the object position determination unit 12 and the view point position determined by the view point position determination unit 13. Reference numeral 17 denotes a frame rate determination unit for determining a frame rate of the moving image to be mapped to the object according to the distance calculated by the distance calculation unit 16. More specifically, a table or a formula showing the relationship between distances from the view point position to the object and frame rates is preset, and the distance calculated by the distance calculation unit 16 is compared to those in the table or the formula to thereby determine the frame rate of the moving image to be mapped to the object. Reference numeral 18 denotes a frame rate control unit for controlling the moving image generation unit to which moving image data to be mapped to the object is input externally so that it extracts necessary frames from frames of the moving image data in order to obtain the frame rate determined by the frame rate determination unit 17. Specifically, when the moving image data is intra-frames according to MPEG (Moving Picture Experts Group) standard, control should be performed so that data corresponding to frames (intra-coded I frames) are extracted from a bit stream which is input as the moving image data. Reference numeral 19 denotes the moving image generation unit for extracting the necessary frames from the frames of the moving image data input externally in accordance with an instruction of the frame rate control unit 18 to thereby obtain the frame rate determined by the frame rate determination unit 17. Here, when the input moving image data is compressed data according to MPEG standard or DV (Digital Video), the compressed data is decoded. The moving image data input externally may come from the same source as the three-dimensional object data input to the object generation unit 11 or may come from a different source so long as these data have a correspondence. Reference numeral 20 denotes a display unit for displaying an image of the whole display projection plane which is input from the rasterize unit 15.

FIGS. 2(a) and 2(b) are diagrams showing the relationship between positions of the objects in the three-dimensional virtual space and frame rates at which the moving images are reproduced, which are used in FIG. 1. FIG. 2(a) shows the relationship between the positions of the objects in the three-dimensional virtual space and areas of the objects on the display projection planes. FIG. 2(b) shows an example of change of the frame rate at which the moving image is reproduced, according to the distances from the view point to the objects in the three-dimensional virtual space. The three-dimensional virtual space D is a three-dimensional space virtualized opposite to the view point S with respect to the display projection plane T. The relationship shown in the figure is established when the object of a predetermined size moves in the three-dimensional virtual space as well as it moves therein while keeping an inclination with respect to the display projection plane.

Figure 3:
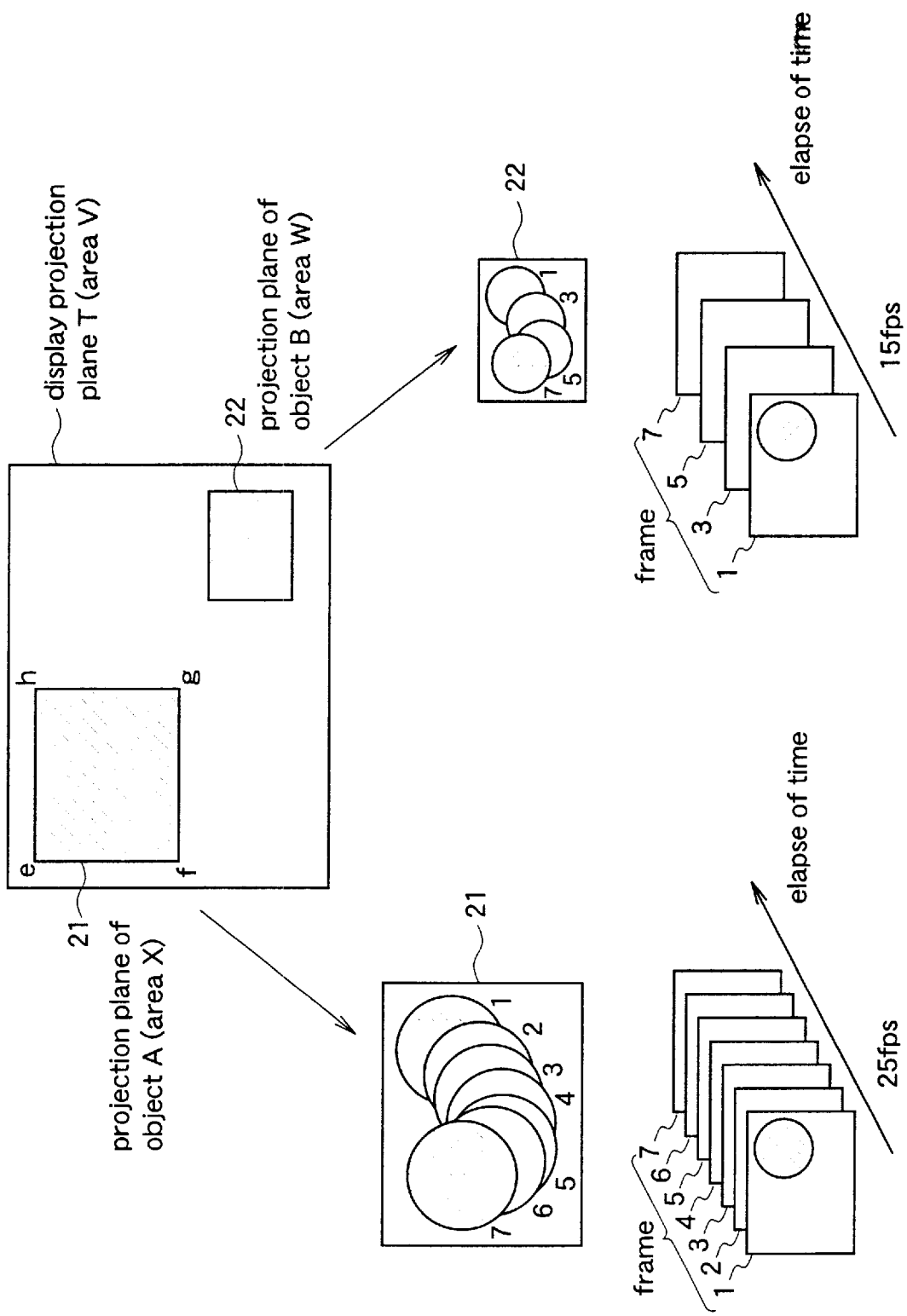
FIG. 3 is a diagram showing the relationship between areas of the objects on the display projection plane and frame rates at which moving images are reproduced, which are used in FIG. 2.

FIG. 3 is a diagram showing the relationship between areas of the objects on the display projection plane shown in FIG. 2(a) and the frame rates at which the moving images are reproduced.

In the figure, reference numeral 21 denotes a projection plane of an object A and represents an area of the object A projected on the display projection plane T, and reference numeral 22 denotes a projection plane of an object B and represents an area of the object B projected on the display projection plane T.

Subsequently, operation of so constructed -apparatus for controlling moving image reproduction quality will be described with reference to FIGS. 1 to 3.

In this first embodiment, suppose that a content such as a game for reproducing the moving image in the three-dimensional virtual space, which is recorded in a DVD (digital video disc) or the like is displayed. In this case, the user inputs data according to a program of the content interactively, and according to the user input, the content is reproduced and displayed.

Initially, three-dimensional object data among the data of contents recorded in the DVD is externally input to the object generation unit 11 from the DVD and the like. When the input three-dimensional object data is associated with the object A, the three-dimensional coordinates of the object A in the three-dimensional virtual space D is determined based on the three-dimensional object data, to thereby generate the object A. The object A is represented by 4 sets of three-dimensional coordinates, i.e., a–d, and thereby an initial value of an initial shape and position of the object A is determined.

The object position determination unit 12 receives the initial value of the object determined by the object generation unit 11 as an input, and then changes the initial value according to the external user input, thus determining the changed position of the object. On this occasion, the user operates a mouse, a keyboard, a joy stick, and the like, according to the program of th e content, to change the object position.

The view point position determination unit 13 receives the object position determined by the object position determination unit 12 as an input, and then changes the view point position according to the external user input, thus determining the changed view point position. Also on this occasion, the user operates the mouse, the keyboard, the joy stick, and the like, according to the program of the content, to change the view point position, although he/she operates the mouse and the like in a mode different from that of the user input to the object position determination unit 12.

The distance calculation unit 16 receives the object position determined by the object position determination unit 12 and the view point position determined by the view point position determination unit 13 as inputs, and calculates the distance from the view point position to the object. For instance, it creates a straight line V for connecting the view point S and a center of gravity γ of the display projection plane. For the object A, it calculates a center of gravity of the plate from its object position, i.e., 4 sets of three-dimensional coordinates, a–d, and finds a distance R from the view point S to a position α on the straight line V, which position is obtained by drawing a line onto the straight line V perpendicularly thereto from the center of gravity, and the distance R is considered as the distance from the view point to the object A.

Figure 4:
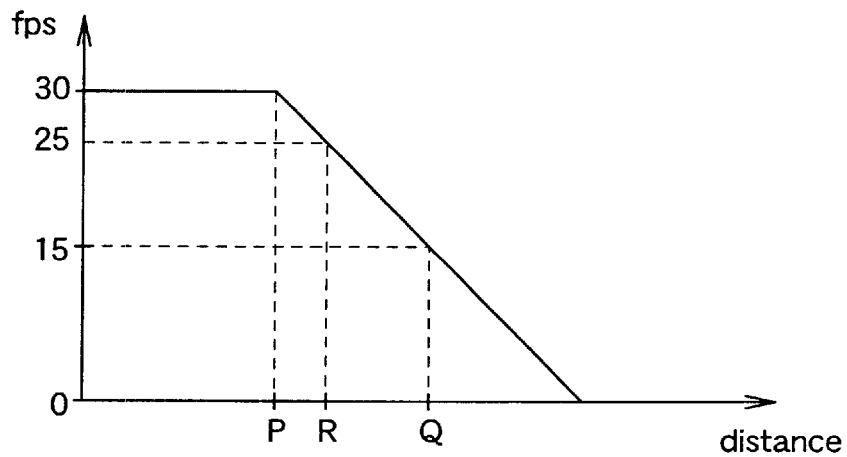
FIGS. 4(a) through 4(c) are diagrams showing the relationship between frame rates and distances from the view point position to the object which is illustrated by a table or a formula preset in a frame rate determination unit shown in FIG. 1.
Figure 4:
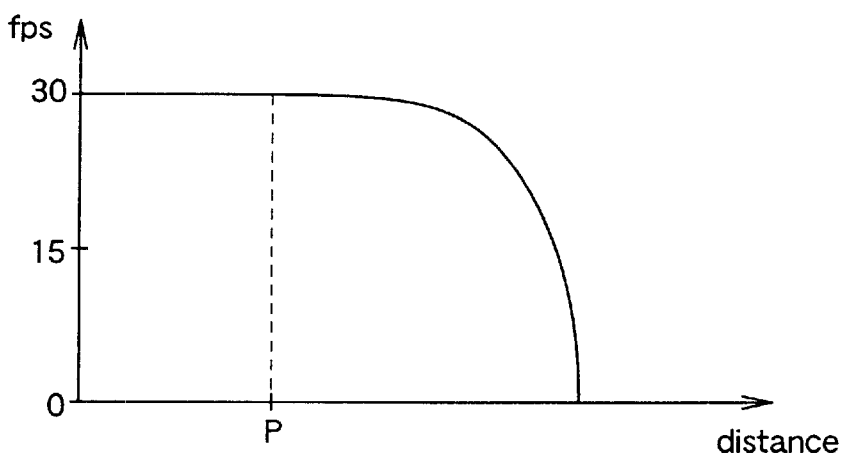
Figure 4:
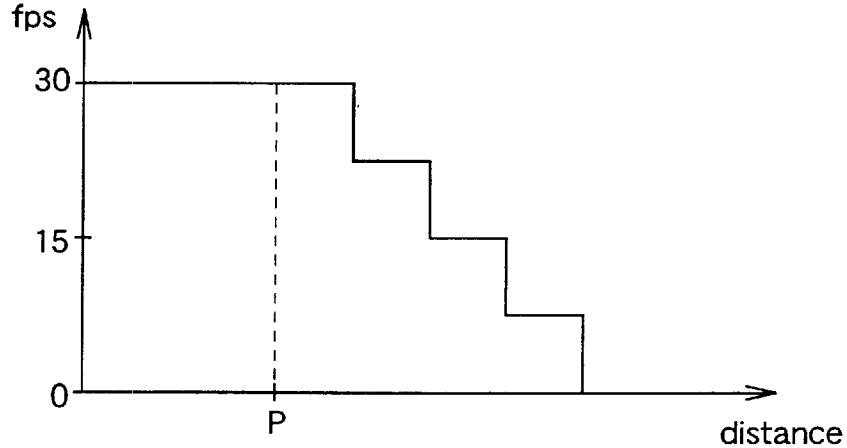

The frame rate determination unit 17 receives the distance calculated by the distance calculation unit 16, and determines the frame rate of the moving image to be mapped to the object, on the basis of the preset table or formula. When the relationship between the frame rates and the distances from the view point position to the object which is shown by the formula set in the frame rate determination unit 17 is illustrated in FIG. 4(a), the frame rate of the object A is determined to be 25 fps (frame/sec) according to the distance R. Also, the frame rate of the object B is determined to be 15 fps according to a distance Q. For the formula preset in the frame rate determination unit 17, instead of the relationship between the frame rates and the distances illustrated in FIG. 4(a), relationships shown in FIGS. 4(b) and 4(c) may be employed.

The frame rate control unit 18 receives the frame rate from the frame rate determination unit 17 as an input, and instructs the moving image generation unit 19 to adjust the frame rate at which the moving image is generated, according to the frame rate. At this time, the moving image generation unit 19 receives the moving image data to be mapped to the object from the external DVD in which the content including the three-dimensional object data input to the object generation unit 11 is recorded, and processes the moving image data to generate the frames of the moving image in accordance with the.instruction of the frame rate control unit 18. Specifically, the moving image generation unit 19 generates the frames of the moving image from the input moving image data at the frame rate (25 fps for the object A and 15 fps for the object B) determined by the frame rate determination unit 17 to which the frame rate (30 fps shown in FIG. 2) of the moving image data on input has been reduced. When the compressed data according to MPEG standard or DVD is input to the moving image generation unit 19, necessary frame data is extracted from an input bit stream and then decoded, thereby reducing decoding amount. This decoding is implemented by using dedicated hardware or by software in CPU, or is shared by the CPU and the dedicated hardware. In any case, processing burden on the CPU or hardware can be reduced.

The perspective projection unit 14 receives the three-dimensional coordinates determined by the object position determination unit 12 and the view point position determined by the view point position determination unit 13 as inputs, performs perspective transformation of the object in the three-dimensional virtual space on the basis of these, and projects it on the display projection plane as the two-dimensional image.

The rasterize unit 15 receives the two-dimensional image perspectively projected by the perspective projection unit 14 and the frame of the moving image generated by the moving image generation unit 19 as inputs, transforms the two-dimensional image to a corresponding image composed of pixel patterns, and performs texture mapping for mapping the frame of the moving image to the portion on which the object is projected. Because the moving image with the frame rate reduced is input, processing of texture mapping can be correspondingly reduced.

The display unit 20 receives the output of the rasterize unit 15 and then displays the image of the content. The process including determination of the initial value of the object performed by the object generation unit 11, processing performed by the object position determination unit 12, the view point position determination unit 13, the perspective projection unit 14, and the rasterize unit 15, and display performed by the display unit 20 is implemented along a normal three-dimensional CG (computer graphics) pipe line.

Thus, the user inputs data interactively to the program of the content, whereby a series of operations of the object position determination unit 12 through the display unit 20 are repeated.

As mentioned previously, however, the relationship between the distances from the view point to the object in the three-dimensional virtual space and the frame rates is established when the object of the predetermined size moves in the three-dimensional virtual space while keeping an inclination with respect to the display projection plane. Hence, it becomes necessary to update this relationship, for a case where the size of the object is changed without changing the distance as well as a case where the inclination is changed without changing the distance.

First, the case where the size of the object is changed will be explained.

Data of the object whose size has been changed is input to the object generation unit 11 from the external DVD or the like, and an initial value of a shape and a position of the object is redetermined.

When only the size of the object is changed, the object position determination unit 12 receives the initial value of the object redetermined by the object generation unit 11 as an input without the user input, and determines the position of the object. Also, the view point position determination unit 13 receives the object position determined by the object position determination unit 12 as an input without the user input, and determines the view point position.

The distance calculation unit 16 receives the object position determined by the object position determination unit 12 and the view point position determined by the view point position determination unit 13 as inputs, and calculates the distance from the view point position to the object. When the object is expanded into a similar figure as an example of change of the object size, the center of gravity of the object and the view point position are not changed, and therefore the distance is not changed.

The frame rate determination unit 17 receives the distance from the viewpoint position to the object and the object position (three-dimensional coordinates of the object) as inputs, from the distance calculation unit 16, decides that the size of the object has been changed from the object position, reselects the table or the formula according to the object size from preset tables or formulas, and with reference to this, determines the frame rate. The frame rate is thus changed without change of the distance.

The other operation is identical to that for the case where the size of the object is not changed.

Next, the case where the inclination of the object is changed will be explained.

Figure 5:
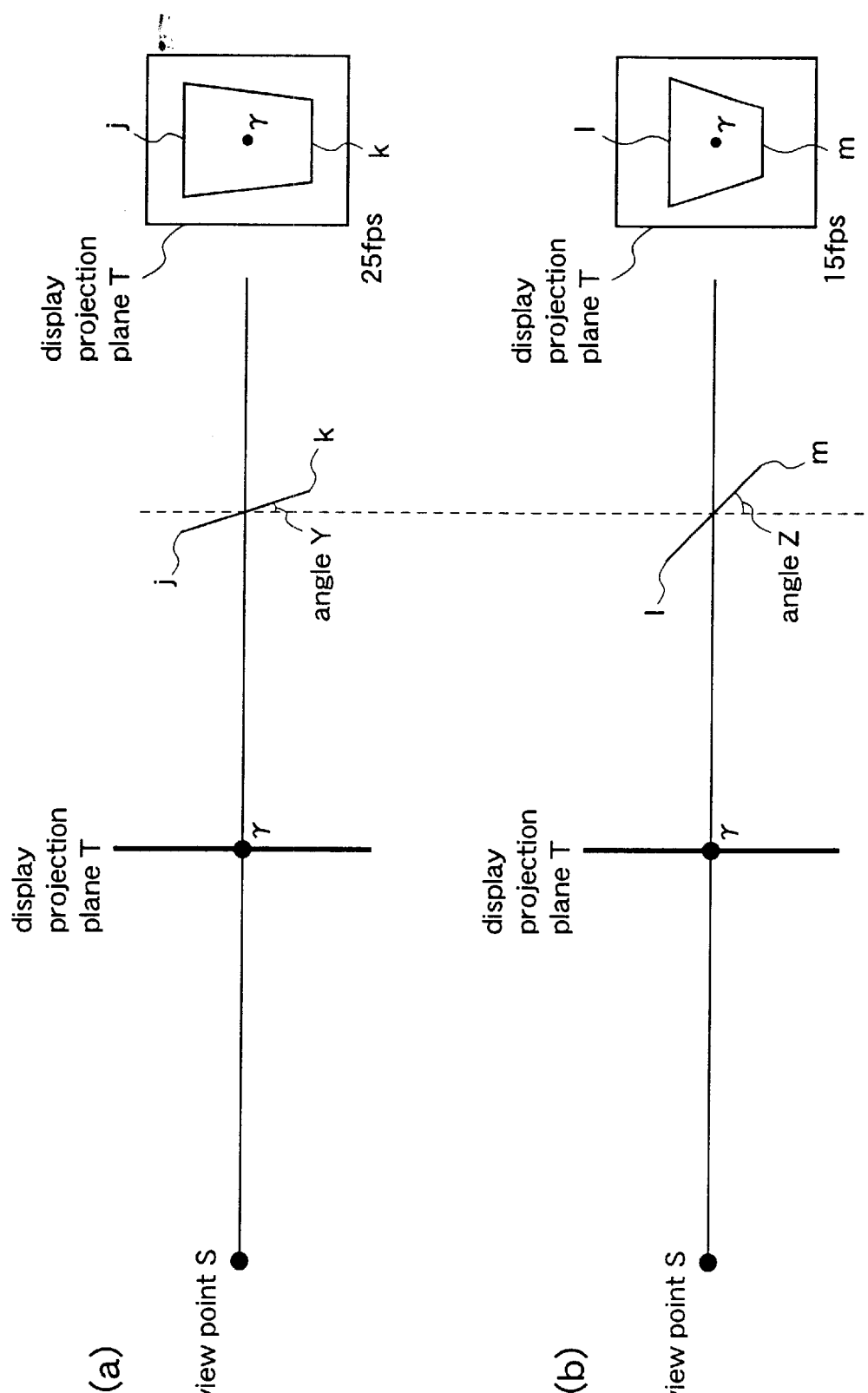
FIGS. 5(a) and 5(b) are diagrams showing the relationship between areas of the objects on the display projection plane and the frame rates at which the moving images are reproduced, when an inclination angle of the object with respect to the display projection plane changes.

FIGS. 5(a) and 5(b) are diagrams showing the relationship between areas of the objects on the display projection plane and frame rates at which the moving images are reproduced, when the inclination of the object with respect to the display projection plane changes. FIG. 5(a) shows a case where the inclination of the object with respect to the display projection plane is small. FIG. 5(b) shows a case where the inclination of the object with respect to the display projection plane is large. Assume that the objects shown in FIGS. 5(a) and 5(b) are equal in size and are equally distant from the display projection plane T.

As illustrated, although these objects are equal in size and are equally distant from the display projection plane T, the area of the object on the display projection plane T is smaller as the inclination of the object with respect to the display projection plane T increases. When the area is smaller, the user feels no degradation of reproduction quality of the moving image reproduced at the reduced frame rate. In other words, for the objects which are equal in size and are equally distant from the display projection plane T, the frame rate can be reduced according to the inclination of the object with respect to the display projection plane T. Accordingly, it is necessary to change the frame rate according to change of the inclination.

When the inclination of the object is changed, the object position determination unit 12 changes the object position, i.e., the inclination of the object, according to the external user input, and thus determines the object position after change of the inclination.

The view point position determination unit 13 receives the object position determined by the object position determination unit 12 as an input, changes the view point position, i.e., the inclination of the object, according to the external user input, with the object position fixed, and thus determines the view point position after change of the inclination. The inclination of the object is thus changed by only changing the object position or by only changing the view point position according to the user input, or by changing both the object position and the view point position. Therefore, the inclination angle of the object with respect to the display projection plane is determined based on the object position (three-dimensional coordinates), the view point position, and the three-dimensional coordinates on the display projection plane. This three-dimensional coordinates on the display projection plane is also determined when the view point position is determined.

The distance calculation unit 16 receives the object position, the view point position, and the coordinates on the display projection plane in the three-dimensional virtual space as inputs, calculates the distance from the view point to the object from the object position and the view point position, and finds the inclination angle of the object with respect to the display projection plane from the object position, the view point position, and the coordinates on the display projection plane.

Figure 6:
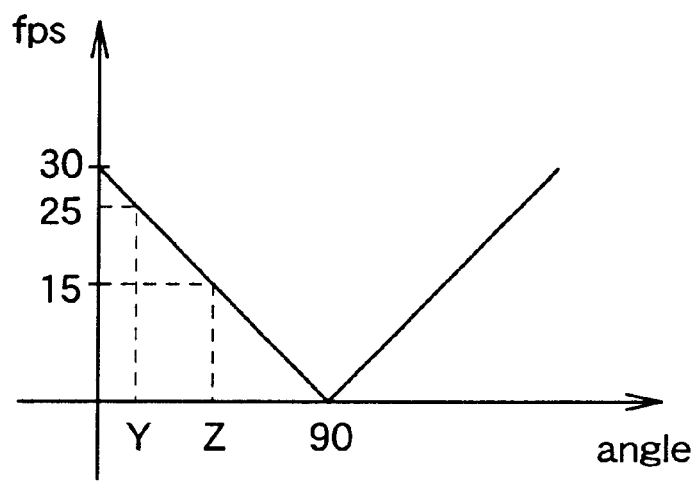
FIGS. 6(a) and 6(b) are diagrams showing the relationship between inclination angles of the object with respect to the display projection plane and the frame rates which is shown by the table or the formula preset in the frame rate determination unit shown in FIG. 1.
Figure 6:
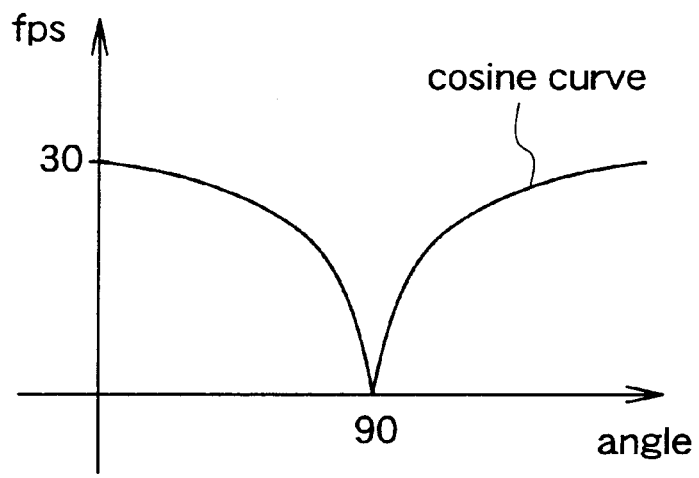

The frame rate determination unit 17 receives the calculated distance and the inclination angle as inputs from the distance calculation unit 16, sets the frame rate on the basis of the preset table or formula showing the relationship between distances and frame rates, and further, corrects the set frame rate according to the inclination angle by using the formula showing the relationship between inclination angles and frame rates, thus determining the frame rate according to the inclination of the object with respect to the display projection plane as well as the distance. As the formula showing the relationship between the inclination angles and the frame rates, a formula as shown in FIGS. 6(a) and 6(b) may be used.

The other operation is identical to that for the case where the distance of the object changes.

Thus, in accordance with the apparatus for controlling moving image reproduction quality according to the first embodiment of the present invention, the object position and the view point position in the three-dimensional virtual space are obtained to calculate the distance from the view point position to the object, the frame rate of the moving image to be mapped to the object is determined according to the distance and on the basis of the preset table or formula, and the frame of the moving image with the frame rate reduced is generated from the moving image data externally input according to the determined frame rate and mapped to the object. Therefore, when a display portion of the object on the display projection plane is smaller, the frame rate of the moving image of the object is reduced. Thereby, without making the user feel degradation of quality of the reproduced moving image on the display screen, the amount of operation in decoding for generating the moving image or texture mapping can be reduced.

When only the size of the object in the three-dimensional virtual space is changed, it is decided that the size of the object has been changed, from the object position (three-dimensional coordinates of the object), and the frame rate is determined on the basis of the table or formula reselected according to the size from the preset tables or formulas. Therefore, according to the change of the size of the object in the three-dimensional virtual space, the frame rate of the moving image of the object is adjusted. Thereby, without making the user feel degradation of quality of the reproduced moving image on the display screen, the amount of operation in decoding for generating the moving image or texture mapping can be reduced.

When the inclination angle of the object with respect to the display projection plane is changed, it is decided that the inclination has been changed, from the object position, the view point position, and the three-dimensional coordinates on the display projection plane, and the frame rate is determined according to the changed inclination on the basis of the preset table or formula showing the relationship between the inclinations and the frame rates. Since the display portion on the display projection plane becomes smaller with an increase in the inclination angle of the object with respect to the display projection plane, the frame rate of the moving image of the object is adjusted by reducing it. Thereby, without making the user feel degradation of quality of the reproduced moving image on the display screen, the amount of operation in decoding for generating the moving image or texture mapping can be reduced.

While in the first embodiment the frame rate of the moving image mapped to the object is determined according to the distance from the view point to the object in the three-dimensional virtual space, this distance may be replaced by a distance from the display projection plane to the object in the three-dimensional virtual space. Also in this case, the same effects as described are achieved.

Embodiment 2

Figure 7:
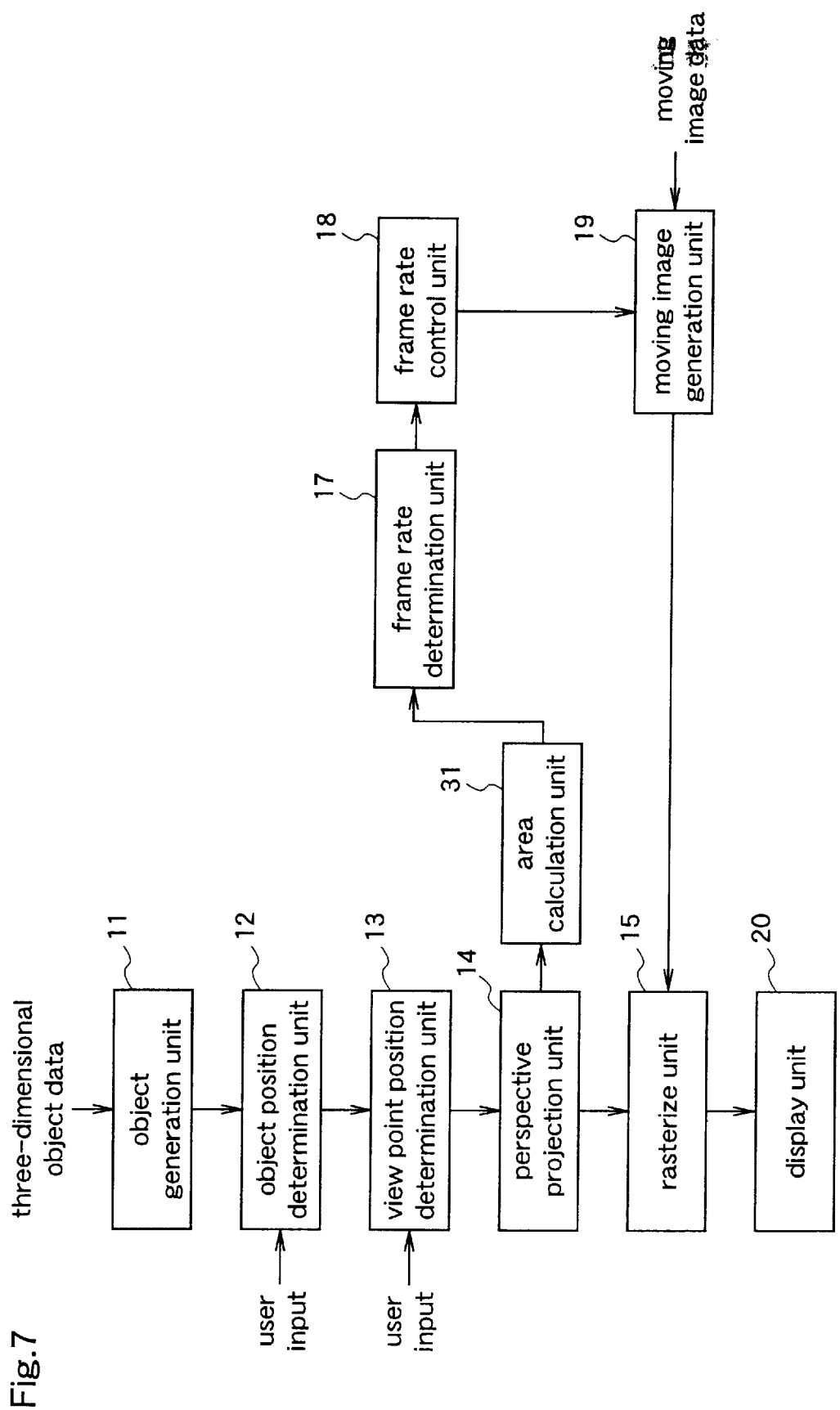
FIG. 7 is a block diagram showing an apparatus for controlling moving image reproduction quality according to a second embodiment of the present invention.

FIG. 7 is a block diagram showing an apparatus for controlling moving image reproduction quality according to a second embodiment of the present invention.

In the figure, the same reference numerals as in FIG. 1 denotes the same or corresponding parts. Reference numeral 31 denotes an area calculation unit that receives two-dimensional image data of the object which has been perspectively transformed by the perspective projection unit 14 as an input, and calculates an area of the two-dimensional image of the object based on the two-dimensional image data.

Operation of the apparatus for controlling moving image reproduction quality so constructed will be described with reference to FIGS. 2(a), 2(b), 3 and 7.

In this second embodiment, like the first embodiment, assume that the content such as the game for reproducing the moving image in the three-dimensional virtual space which is recorded in the DVD and the like is displayed. Also, the relationship between the objects and the areas of the objects on the display projection plane shown in FIGS. 2(a), 2(b) and 3 or the relationship between the areas and the frame rates, as mentioned previously, is established when the object of the predetermined size moves in the three-dimensional virtual space as well as it moves therein while keeping an inclination with respect to the display projection plane.

Like the first embodiment, initially, based on the three-dimensional object data input from the external DVD, the object generation unit 11, the object position determination unit 12, and the view point position determination unit 14 perform respective operations, and the perspective projection unit 14 performs perspective transformation of the object to project a two-dimensional image on the display projection plane.

The area calculation unit 31 receives the two-dimensional image data of the object which has been perspectively projected by the perspective projection unit 14 and then calculates the area of the object on the display projection plane based on the two-dimensional image data. For example, for the object A, an area X is calculated from 4 sets of two-dimensional coordinates e–h on the projection plane 21.

The frame rate determination unit 17 receives the area of the object calculated by the area calculation unit 31, and determines the frame rate of the moving image to be mapped to the object according to the area, on the basis of the preset table or formula.

Figure 8:
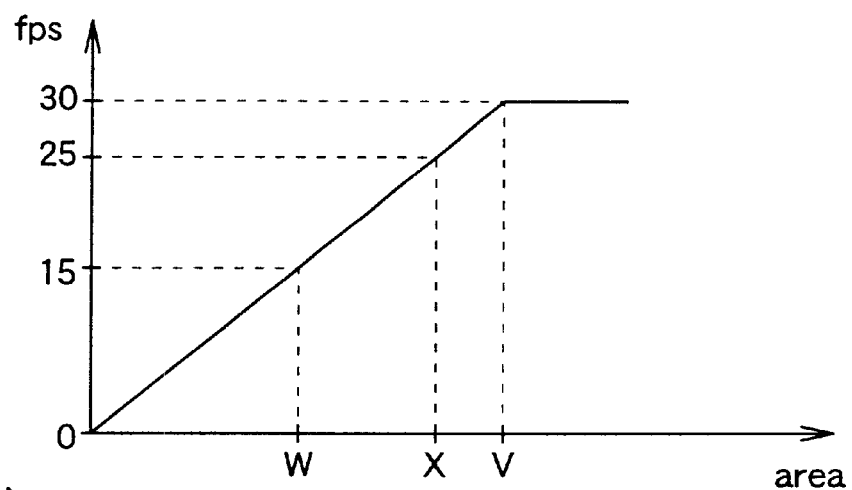
FIGS. 8(a) through 8(c) are diagrams showing the relationship between the frame rates and the areas of the object on the display projection planes, which is shown by the table or the formula, present in a frame rate determination unit shown in FIG. 7.
Figure 8:
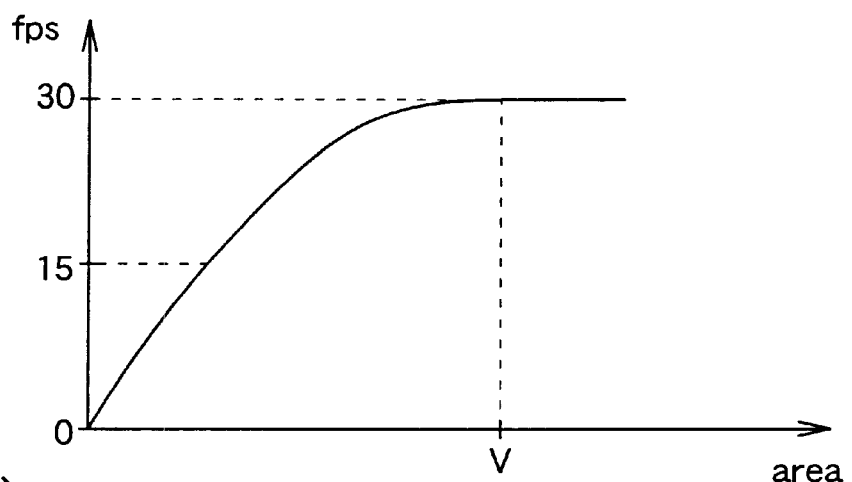
Figure 8:
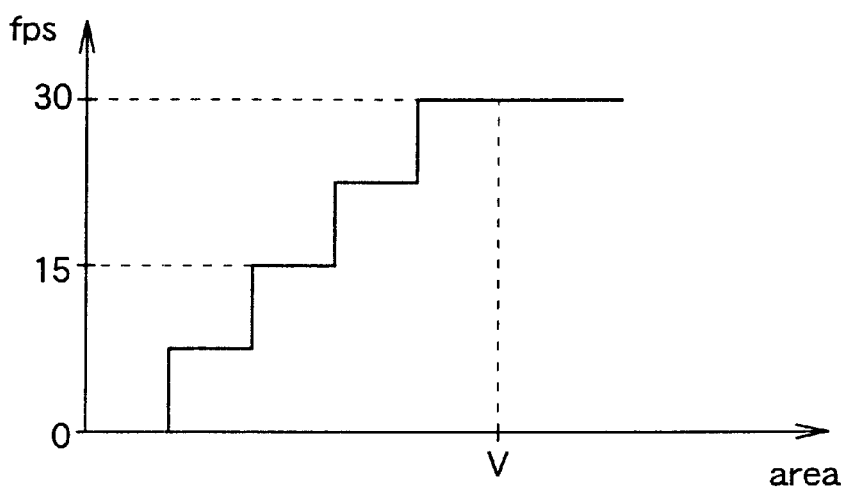

When the formula set in the frame rate determination unit 17 shows the relationship between the frame rates and the areas as illustrated in FIG. 8(a), the frame rate of the object A is determined to be 25 fps according to the area X and the frame rate of the object B is determined to be 15 fps according to the area W. As other examples of the formula, the relationship between the frame rates and the areas illustrated in FIGS. 8(b) or 8(c) may be employed. Of course, the formula may be replaced by a table showing the relationship between the frame rates and the areas.

Thereafter, like the first embodiment, the frame rate control unit 18 receives the frame rate from the frame rate determination unit 17 as an input, and instructs the moving image generation unit 19 to control the frame rate at which the moving image is generated, according to the determined frame rate.

The rasterize unit 15 receives the two-dimensional image which has been perspectively projected by the perspective projection unit 14 and the frame of the moving image generated by the moving image generation unit 19 as inputs, transforms the two-dimensional image to a corresponding image composed of pixel patters, and performs texture mapping for mapping the frame of the moving image to a portion on which the object is projected.

The display unit 20 receives the output of the rasterize unit 15 and displays the image of the content.

As mentioned previously, the relationship between the areas of the object on the display projection plane and the frame rates is established when the object of the predetermined size moves. Hence, when the.size of the object is changed, it is necessary to update the relationship.

When the size of the object is changed, data of the object whose size has been changed is input to the object generation unit 11 from the external DVD or the like, and an initial value of a shape and a position of the object is redetermined.

When only the size of the object is changed, the object position determination unit 12 receives the initial value of the object redetermined by the object generation unit 11 as an input without the user input, and determines the position of the object. Also, the view point position determination unit 13 receives the object position determined by the object position determination unit 12 as an input without the user input, and determines the view point position.

The perspective projection unit 14 receives the object position determined by the object position determination unit 12 and the view point position determined by the view point position determination unit 13 as inputs and performs perspective transformation of the object in the three-dimensional virtual space based on these to project a two-dimensional image on the display projection plane. Since only the size of the object is changed, the area of the object on the display projection plane is correspondingly changed according to change of size. However, it is not decided whether this change of the area results from the change of the size of the object or movement of the object in the three-dimensional virtual space.

The frame rate determination unit 17 receives the area of the object on the display projection plane and the object position (three-dimensional coordinates of the objects) as inputs from the area calculation unit 31, decides that the size of the object has been changed, from the object position, reselects the table or the formula according to the object size from the preset tables or formulas, and with reference to this, determines the frame rate.

The other operation is identical to that for the case where the size of the object is not changed.

Thus, in accordance with the apparatus for controlling moving image reproduction quality according to the second embodiment of the present invention, the area of the object on the display projection plane is calculated based on the two-dimensional image data obtained by performing perspective transformation of the object according to the object position and the view point position in the three-dimensional virtual space, the frame rate of the moving image to be mapped to the object is determined according to the area and on the basis of the preset table or formula, and the frame of the moving image with the frame rate reduced is generated from the moving image data externally input, according to the determined frame rate and mapped to the object. Therefore, when the display portion of the object on the display projection plane is smaller, the frame rate of the moving image of the object is reduced. Thereby, without making the user feel degradation of quality of the reproduced moving image on the display screen, the amount of operation in decoding for generating the moving image or texture mapping can be reduced.

When the size of the object in the three-dimensional virtual space is changed, it is decided that the object size has been changed, from the object position (three-dimensional coordinates of the object), and the frame rate is determined according to the changed size on the basis of the preset table or formula showing the relationship between the object sizes and the frame rates. Therefore, according to change of the size of the object in the three-dimensional virtual space, the frame rate of the moving image of the object is adjusted. Thereby, without making the user feel degradation of quality of the reproduced moving image on the display screen, the amount of operation in decoding for generating the moving image or texture mapping can be reduced.

While in the second embodiment the frame rate of the moving image mapped to the object is determined according to the area of the object on the display projection plane, the area may be replaced by longitudinal and lateral lengths of the display region of the object projected on the display projection plane. Also in this case, the same effects as described above are achieved.

In addition, the ratio of the area of the object on the display projection plane to the area of the entire display projection plane may be calculated, and according to the ratio, the frame rate may be determined.

Further, according to the ratio of the area of the object on the display projection plane to the area of the moving image data set when input to the moving image generation unit, the frame rate may be determined. This is because the area of the moving image data is input to the moving image generation unit irrespective of the area of the entire display projection plane or the area of the object projected on the display projection plane and moving image data having a given area is input for an object by using the same source. As mentioned previously, the moving image data may come from the different source rather than from the same source so long as the moving image data and the three-dimensional object data input to the object generation unit has a correspondence. Hence, the moving image data could be input from plural types of different sources. By way of example, when the source is broadcasting, (720×480) pixel data according to NTSC standard is input, while when the source is Internet, (320×240) pixel data is input. On this occasion, when the former moving image data is mapped to one object on a display projection plane and the latter moving image data is mapped to another object on the same plane, the ratio of the area (number of pixels) of the moving image data set on input to the area of the object on the data projection plane is calculated, and the frame rate is determined according to the ratio.

The area calculation unit of the second embodiment may be provided along with the distance calculation unit in the first embodiment. In this case, the frame rate determination unit sets the table or the formula showing the relationship between the distances and the frame rates and the relationship between the areas and the frame rates, and controls the frame rate by using these as required. Thereby, the frame rate can be reduced as much as possible and the amount of operation in decoding for generating the moving image or texture mapping can be reduced to the utmost, without making the user feel degradation of quality of the reproduced moving image on the display screen.

Embodiment 3

Figure 9:
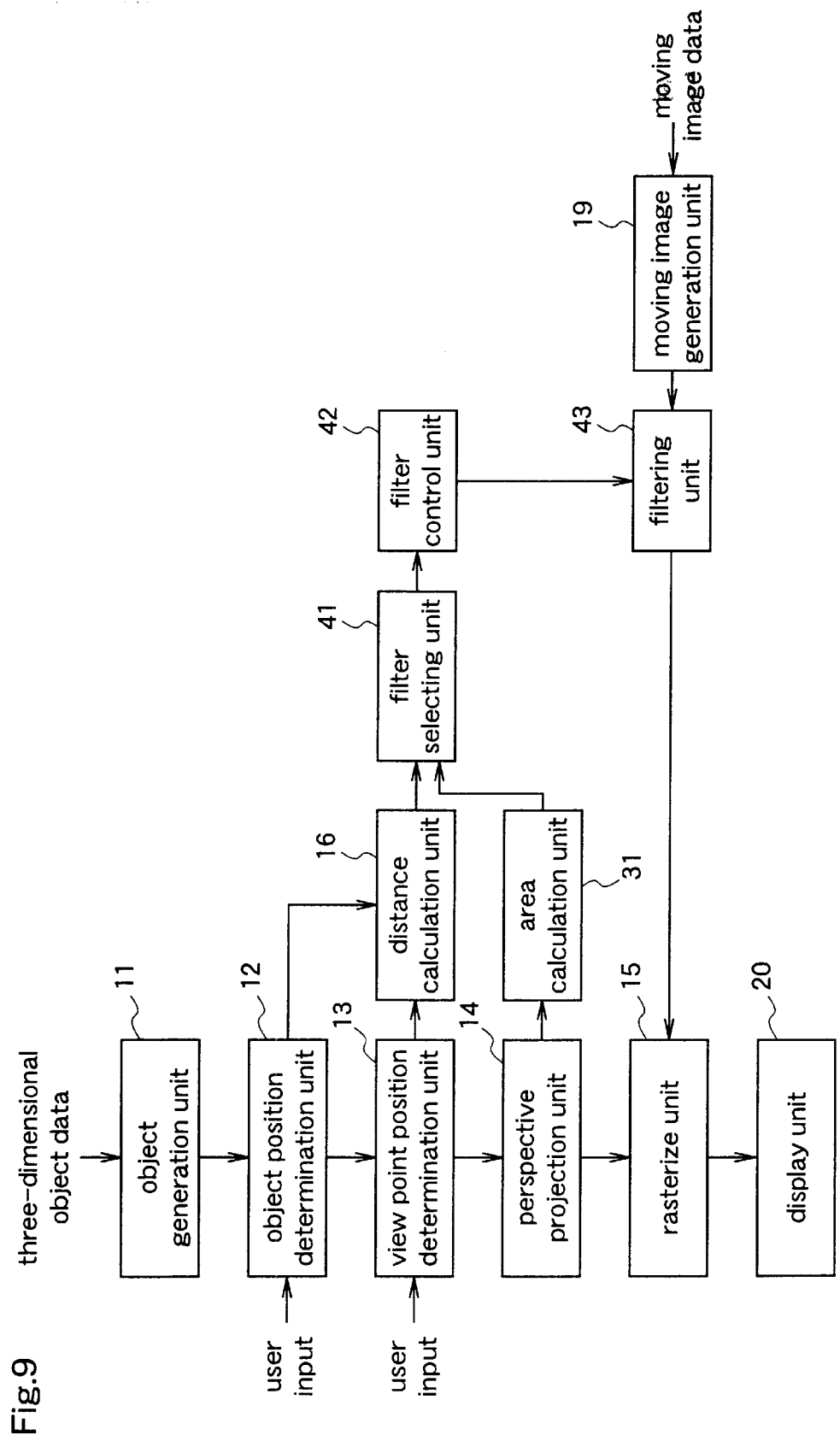
FIG. 9 is a block diagram showing an apparatus for controlling-moving image reproduction quality according to a third embodiment of the present invention.

FIG. 9 is a block diagram showing an apparatus for controlling moving image reproduction quality according to a third embodiment of the present invention.

In the figure, the same reference numerals as in FIG. 1 denotes the same or corresponding parts. Reference numeral 41 denotes a filter selecting unit for selecting a type of a filter to be used in enlargement/reduction of a moving image to be mapped to an object, according to the distance of the object calculated by the distance calculation unit 16 or the area of the object on the display projection plane calculated by the area calculation unit 31 As illustrated in FIGS. 2(*a*), 2(*b*) and 3, the more distant from the view point the object is in the three-dimensional virtual space, the smaller its area on the display projection plane is. The degraded image quality of the object having a smaller area is hard for the user to recognize. For this reason, when the distance is larger or the area is smaller, a filter that performs fewer calculations is selected, or otherwise, a filter that performs more calculations but keeps image quality is selected. As examples of the filter, there are "neighborhood approximation", "bilinear", "trilinear", and the like. Reference numeral 42 denotes a filter control unit for controlling a filtering unit to which the frame of the moving image generated by the moving image generation unit 19 is input so that it filters the frame of the input moving image by using the filter selected by the filter selecting unit 41. Needless to say, like the first and second embodiments, the moving image data externally input to the moving image generation unit 19 may come from the same source as the three-dimensional object data input to the object generation unit 11 or the source different from that of the three-dimensional object data. Reference numeral 43 denotes the filtering unit that receives the frame of the moving image from the moving image generation unit 19 as an input and filters the frame of the input moving image in accordance with an instruction of the filter control unit 42. Therefore, by using the filter selected by the filter control unit 42, the image quality of the moving image is adjusted.

Operation of the apparatus for controlling moving image reproduction quality so constructed will be described with reference to FIGS. 2(a), 2(b), 3 and 9.

In this third embodiment, like the first and second embodiments, assume that the content such as the game for reproducing the moving image in the three-dimensional virtual space which is recorded in the DVD and the like is displayed. The relationship between the positions of the object in the three-dimensional virtual space (distances from the view point to the object) or the areas of the object on the display projection plane and the frame rates at which the moving image is reproduced, which is illustrated in FIGS. 2(a), 2(b) and 3, is applied to the relationship between the distances or the areas and the amount of calculations in filtering when tile moving image is enlarged or reduced. Because degradation of quality of the moving image of a larger distance or a smaller area displayed on the display screen is hardly recognized by the user, such a moving image is processed by the filter that performs fewer calculations, resulting in reduced image quality. Similarly to establishment of the former relationship, the latter relationship is established when the object of the predetermined size moves in the three-dimensional virtual space as well as it moves therein while keeping an inclination with respect to the display projection object.

Like the first and second embodiments, based on the three-dimensional object data input from the external DVD, and along the normal three-dimensional CG pipeline, the object generation unit 11, the object position determination unit 12, and the view point determination unit 13 perform operations, and then the perspective projection unit 14 performs perspective transform of the object to project the two-dimensional image on the display projection plane. The distance calculation unit 16 receives the object position determined by the object position determination unit 12 and the view point position determined by the view point determination unit 13 as inputs and calculates the distance from the view point position to the object. The area calculation unit 31 receives the two-dimensional data of the object perspectively transformed by the perspective projection unit 14 as an input and calculates the area on the display projection plane based on the two-dimensional data.

The filter selecting unit 41 receives the distance calculated by the distance calculation unit 16 or the area of the object on the display projection plane calculated by the area calculation unit 31 as an input and selects a filter according to the distance or the area. For instance, the distance is divided stepwise, and there is provided a table showing the correspondence between the number of steps and the number of taps of the filter, in which the taps are made fewer with an increase in the steps, and according to the table, the filter with taps according to the-input distance is selected. The filter with more taps performs more calculations. Also, as for the area, the filter is selected likewise. Thus, according to distance and the area, filters may be selected separately, and when different filters are selected, adjustment can be made, or one filter may be selected on the basis of a table showing the correspondence among the distances, the areas, and the number of taps of the filter. Needless to say, the filter may be selected according to the distance or the area.

The moving image generation unit 19 receives the moving image data to be mapped to the object from the external DVD in which the content including the three-dimensional object data input to the object generation unit 11 is recorded, and decodes the moving image data to generate the frame of the moving image.

The filter control unit 42 receives the information about the filter selected by the filter selecting unit 41 and controls the filtering unit 43 according to the information so that it performs filtering by using the selected filter.

The filtering unit 43 receives the frame of the moving image from the moving image generation unit 19 as an input and performs filtering for enlarging or reducing the frame of the input moving image. With reference to FIG. 3, when the distance is smaller or the area is larger, that is, the object A is displayed on the display projection plane T as the projection plane 21, the filter which keeps image quality of the moving image is used. On the other hand, when the distance is larger or the area is smaller, that is, the object B is displayed on the display projection plane T as the projection plane 22, the filter that performs fewer calculations is used to process the moving image with the image quality reduced. The filtering unit 43 is thus capable of reducing the amount of calculations required for filtering the moving image according to the distance or the area.

The rasterize unit 15 receives the two-dimensional image perspectively projected by the perspective projection unit 14 and the frame of the moving image processed by the filtering unit 43 as inputs, transforms the two-dimensional image to a corresponding image composed of pixel patters, and performs texture mapping for mapping the frame of the moving image to a portion on which the object is projected.

The display unit 20 receives the output of the rasterize unit 15 as an input and displays the image of the content.

The third embodiment must also deal with change of the object size in the three-dimensional virtual space or change of the inclination of the object with respect to the display projection plane, and this can be implemented like the first and second embodiments. In this case, the filter selecting unit 41 is adapted to select a filter according to an object size on the basis of a preset table showing the correspondence between object sizes and filters to-be-selected, or select a filter according to an inclination on the basis of a preset table showing the correspondence between inclination angles of the object with respect to the display projection plane and filters to-be-selected.

Thus, in accordance with the apparatus for controlling moving image reproduction quality according to the third embodiment of the present invention, the object position and the view point position in the three-dimensional virtual space are obtained to calculate the distance from the view point position to the object, or the area of the object on the display projection plane is calculated based on the two-dimensional image data obtained by performing perspective transformation of the object, the filter used in filtering for enlarging or reducing the moving image to be mapped to the object is selected according to the distance or the area, and the frame of the moving image generated from the moving image data externally input is enlarged or reduced by the filter and mapped to the object. Therefore, when the display portion of the object on the display projection plane is smaller, the moving image of the object is reproduced with the image quality reduced. Thereby, without making the user feel degradation of quality of the reproduced moving image on the display screen, the amount of calculations required for filtering that enlarges or reduces the moving image can be reduced.

When the size of the object in the three-dimensional virtual space is changed, it is decided that the size of the object has been changed, from the object position (three-dimensional coordinates of the object), and the filter according to the changed size is selected on the basis of the preset table showing the object sizes and the filters to-be-selected. Therefore, according to the change of the size of the object in the three-dimensional virtual space, filtering for enlarging or reducing the moving image of the object is controlled. Thereby, without making the user feel degradation of quality of the reproduced moving image on the display screen, the amount of calculations required for filtering that enlarges or reduces the moving image can be reduced.

When the inclination of the object with respect to the display projection plane is changed, it is decided that the inclination has been changed, from the two-dimensional coordinates of the object on the display projection plane, and the filter according to the changed inclination is selected on the basis of the table showing the correspondence between inclinations and filters to-be-selected. Therefore, by controlling the filtering for enlarging or reducing the moving image of the object, the amount of calculation required for filtering which enlarges or reduces the moving image can be reduced, without making the user feel degradation of quality of the reproduced moving image on the display screen.

Further, the apparatus for controlling moving image reproduction quality of the third embodiment may be provided with the frame rate determination unit and the frame rate control unit of the first and second embodiments, for controlling the frame rate as well as the filter. Thereby, the quality of moving image reproduction can be controlled and the amount of calculations required for decoding for generating the moving image, filtering, or texture mapping can be reduced to the utmost, without making the user feel degradation of quality in a temporal direction (frame rate) of the moving image as well as degradation of quality in a spatial direction (image quality) of the moving image reproduced on the display screen.

Moreover, the method illustrated in the first to third embodiments may be implemented by using data recorded in a storage medium such as the CD-ROM, DVD, and the like.

Industrial Availability

The present invention makes the use of the fact that when the moving image is reproduced at a spot distant from the view point of the viewer, its display size is small, and thereby degradation of reproduction quality of the moving image is hardly recognized by the viewer. The present invention provides an apparatus and method for controlling quality of moving image reproduction which is capable of determining the frame rate or the image quality of the moving image according to the distance from the view point to the object in the three-dimensional virtual space, and reducing the amount of operation required for processing the moving image.

What is claimed is:

1. An apparatus operable to control the reproduction quality of a moving image which is reproduced from a fusion of the moving image and three-dimensional computer graphics in a three-dimensional virtual space, said apparatus comprising:

an object generation unit operable to receive three-dimensional object data relating to an object to which the moving image is to be mapped as an external input, and to place the object in the three-dimensional virtual space to generate the object based on the three-dimensional object data;

object position determination unit operable to receive data relating to the object placed in the three-dimensional virtual space as an input, to move the object according to an external user input, and thereby to determine the object position in the three-dimensional virtual space;

a view point position determination unit operable to receive the determined object position as an input, to move a view point in the three-dimensional virtual space according to an external user input, and thereby to determine a view point position according to correlation between the object position and the view point position;

a distance calculation unit operable to receive the object position and the view point position as inputs and to calculate a distance from the view point to the object;

a frame rate determination unit operable to receive the calculated distance as an input, and to determine a frame rate corresponding to the input distance on the basis of a preset table or formula showing a relationship between distances from the view point to the object and frame rates of the moving image to be mapped to the object;

a frame rate control unit operable to receive the determined frame rate as an input and to perform control so that a frame of the moving image to be mapped to the object is reproduced at the determined frame rate;

a moving image generation unit operable to receive moving image data input externally, and to reproduce a necessary frame of the moving image from the moving image data in accordance with the control; and a perspective projection display unit operable to receive the object position, the view point position, and the frame of the reproduced moving image as inputs, to project the object on a two-dimensional display projection plane based on the object position and the view point position, to map the frame of the moving image to a projection plane of the object, and to display the resulting image.

2. The apparatus of claim 1, wherein said distance calculation unit is further operable to receive coordinates on the display projection plane in the three-dimensional virtual space as an input, and to find an inclination angle of the object with respect to the display projection plane based on the object position, the view point position, and the coordinates on the display projection plane in the three-dimensional virtual space, and wherein said frame rate determination unit is further operable to update the frame rate determined according to the distance into a frame rate corresponding to the distance and the inclination angle, on the basis of a preset table or formula showing a relationship between inclination angles and frame rates of the moving image to be mapped to the object.

3. The apparatus of claim 1, wherein said distance calculation unit is operable to further receive the object position as an input from said perspective projection unit, and wherein said frame rate determination unit, when three-dimensional object data whose object size has been changed is externally input to said object veneration unit, is further operable to receive the object position as an input from said distance calculation unit, and recognizes that object size has been changed, from the object position, and to update the frame rate determined according to the distance into a frame rate corresponding to the changed object size, on the basis of a preset table or formula showing a relationship between object sizes and frame rates of the moving image to be mapped to the object.

4. An apparatus operable to control the reproduction quality of a moving image which is reproduced from a fusion of the moving image and three-dimensional computer graphics in a three-dimensional virtual space, said apparatus comprising:

an object generation unit operable to receive three-dimensional object data relating to an object to which the moving image is to be mapped as an external input, and to place the object in the three-dimensional virtual space to generate the object based on the three-dimensional object data;

an object position determination unit operable to receive data relating to the object placed in the three-dimensional virtual space as an input from said object generation unit, to move the object according to an external user input, and thereby to determine the object position in the three-dimensional virtual space;

a view point position determination unit operable to receive the determined object position as an input, to move a view point in the three-dimensional virtual space according to an external user input, and thereby to determine a view point position according to correlation between the object position and the view point position;

perspective projection unit operable to receive the object position and the view point position as inputs and to project the object on a two-dimensional display projection plane according to the object position and the view point position;

an area calculation unit operable to receive data relating to a projection plane of the perspectively projected object, and to calculate an area of the projection plane;

a frame rate determination unit operable to receive the calculated area as an input, and to determine a frame rate corresponding to the input area on the basis of a preset table or formula showing a relationship between areas of the projection plane of the object and frame rates of the moving image to be mapped to the projection plane;

a frame rate control unit operable to receive the determined frame rate as an input and to perform control so that a frame of the moving image to be mapped to the object is reproduced at the determined frame rate;

a moving image generation unit operable to receive moving image data input externally, and to reproduce a necessary frame of the moving image from the moving image data in accordance with the control; and a display unit operable to map the frame of the moving image input from said moving image generation unit to the two-dimensional display projection plane on which the object has been perspectively projected as an input from said perspective projection unit, and to display the resulting image.

5. The apparatus of claim 4, wherein said area calculation unit is further operable to receive the object position as an input from said perspective projection unit, and wherein said frame rate determination unit, when three-dimensional object data whose object size has been changed is externally input to said object generation unit, is further operable to receive the object position as an input from said area calculation unit, and to recognize that object size has been changed, from the object position, and to update the frame rate determined according to the area into a frame rate corresponding to the changed object size, on the basis of a preset table or formula showing a relationship between object sizes and frame rates of the moving image to be mapped to the object.

6. An apparatus operable to control the reproduction quality of a moving image which is reproduced from a fusion of the moving image and three-dimensional computer graphics in a three-dimensional virtual space, said apparatus comprising:

an object generation unit operable to receive three-dimensional object data relating to an object to which the moving image is to be mapped as an external input, and to place the object in the three-dimensional virtual space to generate the object based on the three-dimensional object data;

an object position determination unit operable to receive data relating to the object placed in the three-dimensional virtual space as an input from said object generation unit, to move the object according to an external user input, and thereby to determine the object position in the three-dimensional virtual space;

a view point position determination unit operable to receive the determined object position as an input, to move a view point in the three-dimensional virtual space according to an external user input, and thereby to determine a view point position according to correlation between the object position and the view point position;

a distance calculation unit operable to receive the object position and the view point position as inputs and to calculate a distance from the view point to the object;

a filter selecting unit operable to receive the calculated distance as an input and to select a filter corresponding to the input distance on the basis of a preset table or formula showing a relationship between distances from the view point to the object and filters used for enlarging or reducing the moving image to be mapped to the object;

a filter control unit operable to receive information about the filter selected by said filter selecting unit as an input and to perform control so that a frame of the moving image to be mapped to the object is enlarged or reduced by using the selected filter;

a moving image generation unit operable to receive moving inputted externally image data and to reproduce the frame of the moving image from the moving image data;

a filtering unit operable to receive the frame of the moving image as an input from said moving image generation unit and to filter the frame in accordance with the control executed by said filter control unit; and a perspective projection display unit operable to receive the object position, the view point position, and the filtered frame of the moving image as inputs, to project the object on a two-dimensional display projection plane based on the object position and the view point position, to map the frame of the moving image to the projection plane of the object, and to display the resulting image.

7. The apparatus of claim 6, wherein said distance calculation unit is further operable to receive coordinates on the display projection plane in the three-dimensional virtual space as an input, and to find an inclination angle of the object with respect to the display projection plane based on the object position, the view point position, and the coordinates on the display projection plane in the three-dimensional virtual space, and wherein said filter selecting unit is further operable to update the filter selected according to the distance into a filter corresponding to the distance and the inclination angle, on the basis of a preset table or formula showing a relationship between inclination angles and filters used for enlarging or reducing the moving image to be mapped to the object.

8. The apparatus of claim 6, wherein said distance calculation unit is further operable to receive the object position as an input from said perspective projection unit, and wherein said filter selecting unit, when three-dimensional object data whose object size has been changed is externally input to said object generation unit, is further operable to receive the object position as an input from said distance calculation unit, to recognize that object size has been changed, from the object position, and to update the filter selected according to the distance into a filter corresponding to the changed object size on the basis of a preset table or formula showing a relationship between object sizes and filters used for enlarging or reducing the moving image to be mapped to the object.

9. An apparatus operable to control the reproduction quality of a moving image which is reproduced from a fusion of the moving image and three-dimensional computer graphics in a three-dimensional virtual space, said apparatus comprising:

an object generation unit operable to receive three-dimensional object data relating to an object to which the moving image is to be mapped as an external input, and to place the object in the three-dimensional virtual space to generate the object based on the three-dimensional object data;

an object position determination unit operable to receive data relating to the object placed in the three-dimensional virtual space as an input from said object generation unit, to move the object according to an external user input, and thereby to determine the object position in the three-dimensional virtual space;

a view point position determination unit operable to receive the determined object position as an input, to move a view point in the three-dimensional virtual space according to an external user input, and thereby to determine a view point position according to correlation between the object position and the view point position;

a perspective projection unit operable to receive the object position and the view point position as inputs and to project the object on a two-dimensional display projection plane based on the object position and the view point position;

an area calculation unit operable to receive data relating to a projection plane of the perspectively projected object, and to calculate an area of the projection plane;

a filter selecting unit operable to receive the calculated area as an input and to select a filter corresponding to the input area on the basis of a preset table or formula showing a relationship between areas of the projection plane of the object and filters used for enlarging or reducing the moving image to be mapped to the projection plane;

a filter control unit operable to receive information about the selected filter and to perform control so that a frame of the moving image to be mapped to the object is enlarged or reduced by using the selected filter;

a moving image generation unit operable to receive moving image data input externally, and to reproduce the frame of the moving image from the moving image data;

a filtering unit operable to receive the frame of the moving image as an input from said moving image generation unit and to filter the frame in accordance with the control executed by said filter control unit; and a display unit operable to map the frame of the moving image input from said moving image generation unit to the two-dimensional display projection plane on which the object has been perspectively projected as an input from said perspective projection unit, and to display the resulting image.

10. The apparatus for controlling moving image reproduction quality of claim 9, wherein said area calculation unit is further operable to receive the object position as an input from said perspective projection unit, and wherein said filter selecting unit, when three-dimensional object data whose object size has been changed is input externally to said object generation unit, is further operable to receive the object position as an input from said area calculation unit, to recognize that object size has been changed, from the object position, and to update the filter selected according to the area into a filter corresponding to the changed object size, on the basis of a preset table or formula showing a relationship between object sizes and filters used for enlarging or reducing the moving image to be mapped to the object.

11. A method for controlling the reproduction quality of a moving image which is reproduced from a fusion of the moving image and three-dimensional computer graphics in a three-dimensional virtual space, said method comprising:

generating an object comprising receiving three-dimensional object data relating to an object to which the moving image is to be mapped as an external input, and placing the object in the three-dimensional virtual space to generate the object based on the three-dimensional object data;

determining an object position comprising receiving data relating to the object placed in the three-dimensional virtual space as an input, moving the object according to an external user input, and thereby determining the object position in the three-dimensional virtual space;

determining a view point position comprising receiving the determined object position as an input, moving a view point in the three-dimensional virtual space according to an external user input, and thereby determining a view point position according to correlation between the object position and the view point position;

calculating a distance comprising receiving the object position and the view point position as inputs and calculating a distance from the view point to the object, determining a frame rate comprising receiving the calculated distance as an input, and determining a frame rate corresponding to the input distance on the basis of a preset table or formula showing a relationship between distances from the view point to the object and frame rates of the moving image to be mapped to the object;

controlling a frame rate comprising receiving the determined frame rate as an input and performing control so that a frame of the moving image to be mapped to the object is reproduced at the determined frame rate;

generating a moving image comprising receiving moving image data input externally, and reproducing a necessary frame of the moving image from the moving image data in accordance with the control; and displaying a perspective projection comprising receiving the object position, the view point position, and the reproduced frame of the moving image as inputs, projecting the object on a two-dimensional display projection plane based on the object position and the view point position, mapping the frame of the moving image to a projection plane of the object, and displaying the resulting image.

12. The method of claim 11, wherein said calculating a distance further comprises receiving coordinates on the display projection plane in the three-dimensional virtual space as an input, and finding an inclination angle of the object with respect to the display projection plane based on the object position, the view point position, and the coordinates on the display projection plane in the three-dimensional virtual space, and wherein said determining a frame rate further comprises updating the frame rate determined according to the distance into a frame rate corresponding to the distance and the inclination angle, on the basis of a preset table or formula showing a relationship between inclination angles and frame rates of the moving image to be mapped to the object.

13. The method of claim 11, wherein said calculating a distance further comprises receiving the object position as an input from said projecting a perspective, and wherein said determining frame rate, when three-dimensional object data whose object size has been changed is given to said generation of an object as an external input, is further operable to receive the object position as an input from said calculation of a distance, to recognize that the object size has been changed, from the object position, and to update the frame rate determined according to the distance into a frame rate corresponding to the changed object size, on the basis of a preset table or formula showing a relationship between object sizes and frame rates of the moving image to be mapped to the object.

14. A method for controlling the reproduction quality of a moving image which is reproduced from a fusion of the moving image and three-dimensional computer graphics in a three-dimensional virtual space, said method comprising:

generating an object comprising receiving three-dimensional object data relating to an object to which the moving image is to be mapped as an external input, and placing the object in the three-dimensional virtual space to generate the object based on the three-dimensional object data;

determining an object position comprising, receiving data relating to the object placed in the three-dimensional virtual space as an input from said object generation step, moving the object according to an external user input and thereby determining the object position in the three-dimensional virtual space;

determining a view point position comprising receiving the determined object position as an input, moving a view point in the three-dimensional virtual space according to an external user input, and thereby determining a view point position according to correlation between the object position and the view point position;

projecting a perspective comprising receiving the object position and the view point position as inputs and projecting the object on a two-dimensional display projection plane based on the object position and the view point position;

calculating an area comprising receiving data relating to a projection plane of the perspectively projected object and calculating an area of the projection plane;

determining a frame rate comprising receiving the calculated area as an input, and determining a frame rate corresponding to the input area on the basis of a preset table or formula showing a relationship between areas of the projection plane of the object and frame rates of the moving image to be mapped to the projection plane;

controlling a frame rate comprising receiving the determined frame rate as an input and performing control so that a frame of the moving image to be mapped to the object is reproduced at the determined frame rate;

generating a moving image comprising receiving moving image data input externally, and reproducing a necessary frame of the moving image from the moving image data in accordance with the control; and mapping the frame of the moving image as an input from said generating a moving image to the two-dimensional display projection plane on which the object has been perspectively projected as an input from said projecting a perspective, and displaying the resulting image.

15. The method for controlling moving image reproduction quality of claim 14, wherein said calculating an area further comprises receiving the object position as an input from said projecting a perspective, and wherein said determining a frame rate, when three-dimensional object data whose object size has been changed is given to said object generation step as an external input, further comprises receiving the object position as an input from said calculating an area, recognizing that the object size has been changed, from the object position, and updating the frame rate determined according to the area into a frame rate corresponding to the changed object size, on the basis of a preset table or formula showing a relationship between object sizes and frame rates of the moving image to be mapped to the object.

16. A method for controlling the reproduction quality of a moving image which is reproduced from a fusion of the moving image and three-dimensional computer graphics in a three-dimensional virtual space, said method comprising:

generating an object comprising receiving three-dimensional object data relating to an object to which the moving image is to be mapped as an external input, and placing the object in the three-dimensional virtual space to generate the object based on the three-dimensional object data;

determining an object position comprising receiving data relating to the object placed in the three-dimensional virtual space as an input from said generating an object, moving the object according to an external user, and thereby determining the object position in the three-dimensional virtual space;

determining a view point position comprising, receiving the determined object position as an input, moving a view point in the three-dimensional virtual space according to an external user input, and thereby determining a view point position according to correlation between the object position and the view point position;

calculating a distance comprising receiving the object position and the view point position as inputs and calculating a distance from the view point to the object;

selecting a filter comprising receiving the calculated distance as an input and selecting a filter corresponding to the input distance on the basis of a preset table or formula showing a relationship between distances from the view point to the object and filters used for enlarging or reducing the moving image to be mapped to the object;

controlling a filter comprising receiving information about the filter selected in said selecting a filter as an input and performing control so that a frame of the moving image to be mapped to the object is enlarged or reduced by using the selected filter;

generating a moving image comprising receiving moving image data input externally and reproducing the frame of the moving image from the moving image data;

filtering comprising receiving the frame of the moving image as an input from said generating a moving image and filtering the frame in accordance with the control executed in said controlling a filter control; and displaying a perspective projection comprising receiving the object position, the view point position, and the filtered frame of the moving image as inputs, projecting the object on a two-dimensional display projection plane based on the object position and the view point position, mapping the frame of the moving image to a projection plane of the object, and displaying the resulting image.

17. The method of claim 16, wherein said calculating a distance further comprises receiving coordinates on the display projection plane in the three-dimensional virtual space as an input, and finding an inclination angle of the object with respect to the display projection plane based on the object position, the view point position, and the coordinates on the display projection plane in the three-dimensional virtual space, and wherein said selecting a filter comprises updating the filter selected according to the distance into a filter corresponding to the distance and the inclination angle, on the basis of a preset table or formula showing a relationship between inclination angles and filters used for enlarging or reducing the moving image to be mapped to the object.

18. The method of claim 16, wherein said calculating a distance further comprises receiving the object position as an input from said projecting a perspective, and wherein said selecting a filter, when three-dimensional object data whose object size has been changed is given to said generating an object as an external input, further comprises receiving the object position as an input from said calculating a distance, recognizing that the object size has been changed, from the object position, and updating the filter selected according to the distance into a filter corresponding to the changed object size, on the basis of a preset table or formula showing a relationship between object sizes and filters used for enlarging or reducing the moving image to be mapped to the object.

19. A method for controlling the reproduction quality of a moving image which is reproduced from a fusion of the moving image and three-dimensional computer graphics in a three-dimensional virtual space, said method comprising:

generating an object comprising receiving three-dimensional object data relating to an object to which the moving image is to be mapped as an external input, and placing the object in the three-dimensional virtual space to generate the object based on the three-dimensional object data;

determining an object position comprising receiving data relating to the object placed in the three-dimensional virtual space as an input from said generating an object, moving the object according to an external user input, and thereby determining the object position in the three-dimensional virtual space;

determining a view point position comprising receiving the determined object position as an input, moving a view point in the three-dimensional virtual space according to an external user input, and thereby determining a view point position according to correlation between the object position and the view point position;

projecting a perspective comprising receiving the object position and the view point position as inputs and projecting the object on a two-dimensional display projection plane based on the object position and the view point position;

calculating an area comprising receiving data r elating to a projection plane of the perspectively projected object, and calculating an area of tile projection plane;

selecting a filter comprising receiving the calculated area as an input, and selecting a filter corresponding to the input area on the basis of a preset table or formula showing a relationship between areas of the projection plane of the object and filters used for enlarging or reducing the moving image to be mapped to the projection plane;

controlling a filter comprising receiving information about the selected filter and performing control so that a frame of the moving image to be mapped to the object is enlarged or reduced by using the selected filter;

generating a moving image comprising receiving moving input externally image data, and reproducing the frame of the moving image from the moving image data;

filtering comprising receiving the frame of the moving image as an input from said generating a moving image and filtering the frame in accordance with the control executed in said controlling a filter; and displaying comprising mapping the frame of the moving image as an input from said generating a moving image to the two-dimensional display projection plane on which the object has been perspectively projected as an input from said perspective projection step, and displaying the resulting image.

20. The method of claim 19,
wherein said calculating an area further comprises receiving the object position as an input from said projecting a perspective, and
wherein said selecting a filter, when three-dimensional object data whose object size has been changed is given to said generating an object as an external input, further comprises receiving the object position as an input from said calculating an area, recognizing that the object size has been changed, from the object position, and updating the filter selected according to the area into a filter corresponding to the changed object size, on the basis of a preset table or formula showing a relationship between object sizes and filters used for enlarging or reducing the moving image to be mapped to the object.

* * * * *